(12) United States Patent
Fukuda

(10) Patent No.: US 8,994,971 B2
(45) Date of Patent: Mar. 31, 2015

(54) PRINTING APPARATUS CAPABLE OF ASSIGNING A PIECE OF SHEET INFORMATION TO A FEED TRAY

(71) Applicant: Canon Kabushiki Kaisha, Tokyo (JP)

(72) Inventor: Shin Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/903,515

(22) Filed: May 28, 2013

(65) Prior Publication Data

US 2013/0321863 A1    Dec. 5, 2013

(30) Foreign Application Priority Data

Jun. 5, 2012    (JP) .................................. 2012-128402

(51) Int. Cl.
| | | |
|---|---|---|
| G06F 3/12 | (2006.01) | |
| B65H 3/44 | (2006.01) | |
| G06K 15/00 | (2006.01) | |
| G03G 15/00 | (2006.01) | |
| G06K 15/02 | (2006.01) | |

(52) U.S. Cl.
CPC .............. B65H 3/44 (2013.01); G06K 15/4025 (2013.01); G06K 15/4065 (2013.01); G03G 15/6508 (2013.01); G06K 15/1823 (2013.01); B65H 2557/12 (2013.01)
USPC ......... 358/1.13; 358/1.6; 358/1.12; 358/1.15; 358/1.16; 358/1.18; 358/498; 399/370; 399/376; 399/389; 399/397; 271/9.05; 271/9.06; 271/9.09

(58) Field of Classification Search
CPC combination set(s) only.
See application file for complete search history.

(56) References Cited

U.S. PATENT DOCUMENTS

| | | | |
|---|---|---|---|
| 7,633,659 B2 * | 12/2009 | Uotani et al. .................. | 358/527 |
| 2004/0037581 A1 * | 2/2004 | Maeda ............................ | 399/82 |
| 2004/0218196 A1 | 11/2004 | Van Vliembergen et al. | |
| 2006/0285900 A1 * | 12/2006 | Kurita ............................ | 399/361 |
| 2012/0224204 A1 * | 9/2012 | Yamagishi .................... | 358/1.13 |
| 2013/0221599 A1 * | 8/2013 | Miyahara ...................... | 271/9.06 |
| 2013/0329256 A1 * | 12/2013 | Fukuda ......................... | 358/1.15 |

FOREIGN PATENT DOCUMENTS

| | | | |
|---|---|---|---|
| JP | 2004-330781 A | 11/2004 | |
| JP | 2008-55787 A | 3/2008 | |

* cited by examiner

*Primary Examiner* — Miya J Cato
(74) *Attorney, Agent, or Firm* — Fitzpatrick, Cella, Harper & Scinto

(57) ABSTRACT

A printing apparatus according to an aspect of the present invention includes a plurality of sheet feed trays, stores sheet information including property information indicating a property of a sheet and sheet feed tray information indicating a sheet feed tray to which the sheet is allowed to be assigned, and selects a sheet feed tray from the plurality of sheet feed trays based on a designation made by a user. The printing apparatus further displays a sheet allowed to be assigned to the selected sheet feed tray based on the stored sheet information and assigns, to the selected sheet feed tray, a sheet designated by the user from among the displayed sheets.

6 Claims, 24 Drawing Sheets

FIG. 3A

SHEET LIBRARY

| | SHEET NAME | SHEET WIDTH (mm) 312 | SHEET HEIGHT (mm) 313 | GRAMMAGE (g/m²) 314 | COLOR 315 | SHEET FEED TRAYS FOR WHICH ASSIGNMENT IS ALLOWED 316 |
|---|---|---|---|---|---|---|
| 301 | ABC COMPANY PAPER RECYCLE 1 | 210 | 297 | 75 | WHITE | SHEET FEED TRAY 1, SHEET FEED TRAY 2 |
| 302 | ABC COMPANY PAPER RECYCLE 2 | 297 | 420 | 75 | WHITE | SHEET FEED TRAY 1, SHEET FEED TRAY 2 |
| 303 | DEF COMPANY PAPER HEAVY PAPER LTR | 216 | 279 | 150 | WHITE | SHEET FEED TRAY 3 |
| 304 | DEF COMPANY PAPER NORMAL PAPER 11×17 | 279 | 432 | 80 | YELLOW | SHEET FEED TRAY 6 |
| 305 | XYZ COMPANY PAPER C081 | 148 | 210 | 105 | WHITE | SHEET FEED TRAY 1, SHEET FEED TRAY 2, SHEET FEED TRAY 5 |
| 306 | XYZ COMPANY PAPER C082 | 210 | 297 | 105 | WHITE | SHEET FEED TRAY 1, SHEET FEED TRAY 2, SHEET FEED TRAY 5 |
| 307 | ABC COMPANY PAPER COATED PAPER 1 | 216 | 279 | 120 | WHITE | SHEET FEED TRAY 4 |
| 308 | ABC COMPANY PAPER COATED PAPER 2 | 216 | 279 | 175 | WHITE | SHEET FEED TRAY 4, SHEET FEED TRAY 5 |

(311 = SHEET NAME column)

FIG. 3B

SHEET FEED TRAY SHEET ASSIGNMENT SETTINGS

| SHEET FEED TRAY | SHEET NAME |
|---|---|
| 1 | ABC COMPANY PAPER RECYCLE 1 |
| 2 | ABC COMPANY PAPER RECYCLE 1 |
| 3 | DEF COMPANY PAPER HEAVY PAPER LTR |
| 4 | ABC COMPANY PAPER COATED PAPER 1 |
| 5 | XYZ COMPANY PAPER C081 |
| 6 | DEF COMPANY PAPER NORMAL PAPER 11×17 |

FIG. 4

| EDIT SHEET LIBRARY | | | | |
|---|---|---|---|---|
| SHEET NAME | SHEET WIDTH (mm) | SHEET HEIGHT (mm) | GRAMMAGE (g/m²) | COLOR |
| ABC COMPANY PAPER RECYCLE 1 | 210 | 297 | 75 | WHITE |
| ABC COMPANY PAPER RECYCLE 2 | 297 | 420 | 75 | WHITE |
| DEF COMPANY PAPER HEAVY PAPER LTR | 216 | 279 | 150 | WHITE |
| DEF COMPANY PAPER NORMAL PAPER 11×17 | 279 | 432 | 80 | YELLOW |
| XYZ COMPANY PAPER C081 | 148 | 210 | 105 | WHITE |
| XYZ COMPANY PAPER C082 | 210 | 297 | 105 | WHITE |

[ ADD NEW ]  [ EDIT ]  [ DELETE ]

FIG. 5

EDIT SHEET ATTRIBUTES

| | | |
|---|---|---|
| SHEET NAME | XYZ COMPANY PAPER C081 | 501 |
| SHEET WIDTH (mm) | 148 | 502 |
| SHEET HEIGHT (mm) | 210 | 503 |
| GRAMMAGE (g/m$^2$) | 105 | 504 |
| COLOR | WHITE | 505 |

SHEET FEED TRAYS FOR WHICH ASSIGNMENT IS ALLOWED — 510

- 511 ☑ SHEET FEED TRAY 1
- 512 ☑ SHEET FEED TRAY 2
- 513 ☐ SHEET FEED TRAY 3
- 514 ☐ SHEET FEED TRAY 4
- 515 ☑ SHEET FEED TRAY 5
- 516 ☐ SHEET FEED TRAY 6

520 [ EDITING DONE ]   521 [ CANCEL ]

| SHEET ASSIGNMENT SETTINGS | | | | | |
|---|---|---|---|---|---|
| SHEET NAME | SHEET WIDTH (mm) | SHEET HEIGHT (mm) | GRAMMAGE (g/m²) | COLOR | |
| ABC COMPANY PAPER RECYCLE 1 | 210 | 297 | 75 | WHITE | △ |
| ABC COMPANY PAPER RECYCLE 2 | 297 | 420 | 75 | WHITE | |
| XYZ COMPANY PAPER C081 | 148 | 210 | 105 | WHITE | |
| XYZ COMPANY PAPER C082 | 210 | 297 | 105 | WHITE | ▷ |

710, 711, 712, 713, 714, 715, 716

SETTINGS (720)  CANCEL (721)

700

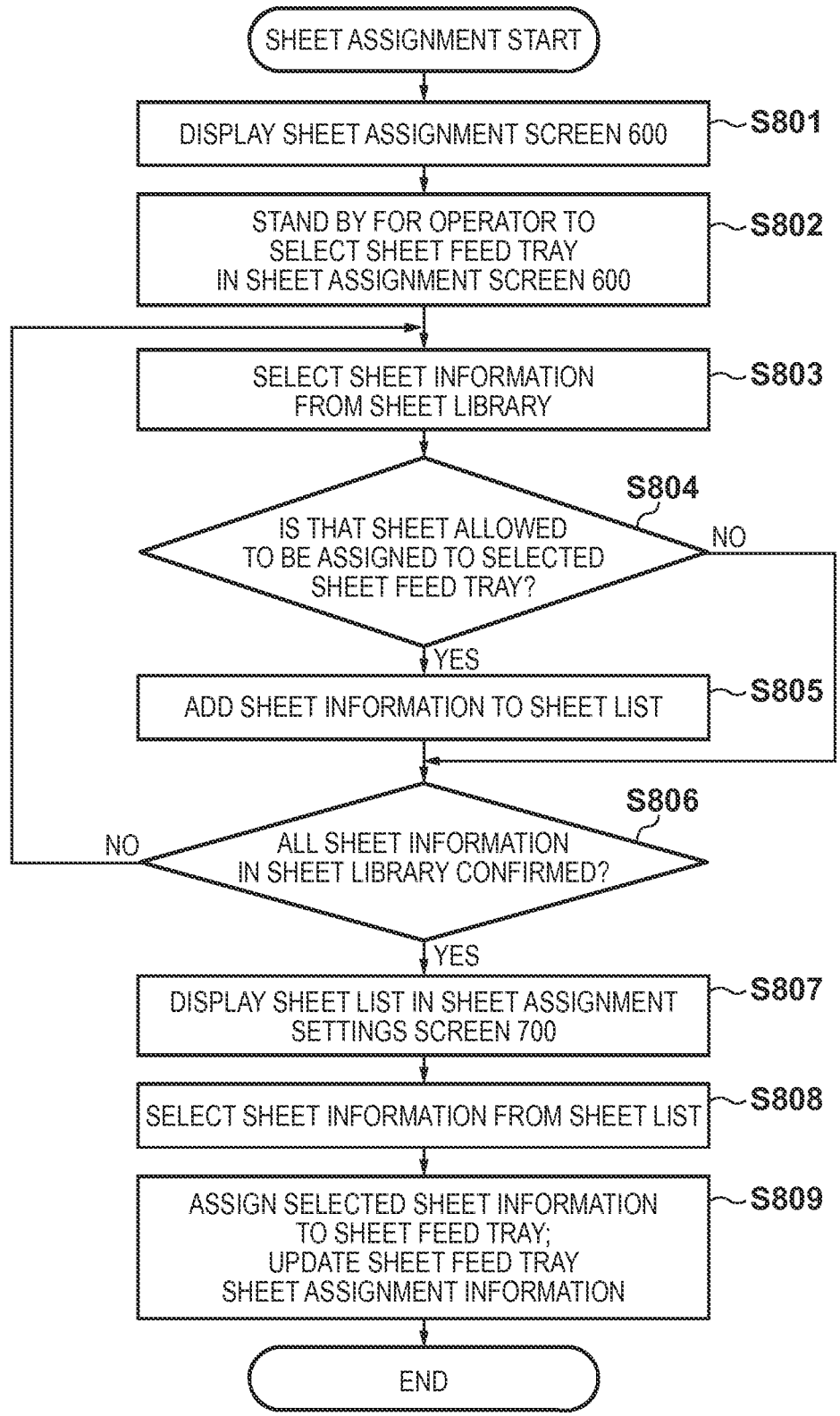

FIG. 9A

SHEET LIST IN CASE WHERE SHEET FEED TRAY 1 IS SELECTED

| SHEET NAME | SHEET WIDTH (mm) | SHEET HEIGHT (mm) | GRAMMAGE ($g/m^2$) | COLOR |
|---|---|---|---|---|
| ABC COMPANY PAPER RECYCLE 1 | 210 | 297 | 75 | WHITE |
| ABC COMPANY PAPER RECYCLE 2 | 297 | 420 | 75 | WHITE |
| XYZ COMPANY PAPER C081 | 148 | 210 | 105 | WHITE |
| XYZ COMPANY PAPER C082 | 210 | 297 | 105 | WHITE |

FIG. 9B

SHEET LIST IN CASE WHERE SHEET FEED TRAY 3 IS SELECTED

| SHEET NAME | SHEET WIDTH (mm) | SHEET HEIGHT (mm) | GRAMMAGE ($g/m^2$) | COLOR |
|---|---|---|---|---|
| DEF COMPANY PAPER HEAVY PAPER LTR | 216 | 279 | 150 | WHITE |

FIG. 9C

SHEET LIST IN CASE WHERE SHEET FEED TRAY 5 IS SELECTED

| SHEET NAME | SHEET WIDTH (mm) | SHEET HEIGHT (mm) | GRAMMAGE ($g/m^2$) | COLOR |
|---|---|---|---|---|
| XYZ COMPANY PAPER C081 | 148 | 210 | 105 | WHITE |
| XYZ COMPANY PAPER C082 | 210 | 297 | 105 | WHITE |
| ABC COMPANY PAPER COATED PAPER 2 | 216 | 279 | 175 | WHITE |

| | SHEET FEED TRAY | FEEDABLE SHEET WIDTH (mm) | FEEDABLE SHEET HEIGHT (mm) | FEEDABLE SHEET GRAMMAGE (g/m²) |
|---|---|---|---|---|
| 1011 | 1 | 148~320 | 180~450 | 50~180 |
| 1012 | 2 | 148~320 | 180~450 | 50~180 |
| 1013 | 3 | 148~300 | 200~420 | 50~300 |
| 1014 | 4 | 100~331 | 180~488 | 50~320 |
| 1015 | 5 | 100~331 | 180~488 | 50~320 |
| 1016 | 6 | 100~331 | 180~488 | 50~320 |

FEEDABLE SHEET INFORMATION 1021  1022  1023

FIG. 12A
EDIT SHEET ATTRIBUTES
| | |
|---|---|
| SHEET NAME | XYZ COMPANY PAPER C081 |
| SHEET WIDTH (mm) | 148 |
| SHEET HEIGHT (mm) | 210 |
| GRAMMAGE (g/m²) | 300 ~504 |
| COLOR | WHITE |
--- SHEET FEED TRAYS FOR WHICH ASSIGNMENT IS ALLOWED ---
511  SHEET FEED TRAY 1    514  SHEET FEED TRAY 4
512  SHEET FEED TRAY 2    515  SHEET FEED TRAY 5
513  SHEET FEED TRAY 3    516  SHEET FEED TRAY 6
[ EDITING DONE ]    [ CANCEL ]
500

F I G. 12B

EDIT SHEET ATTRIBUTES

| | |
|---|---|
| SHEET NAME | XYZ COMPANY PAPER C081 |
| SHEET WIDTH (mm) | 120 |
| SHEET HEIGHT (mm) | 210 |
| GRAMMAGE (g/m²) | 300 |
| COLOR | WHITE |

SHEET FEED TRAYS FOR WHICH ASSIGNMENT IS ALLOWED

- [✓] SHEET FEED TRAY 1
- [✓] SHEET FEED TRAY 2
- [ ] SHEET FEED TRAY 3
- [ ] SHEET FEED TRAY 4
- [✓] SHEET FEED TRAY 5
- [ ] SHEET FEED TRAY 6

[ EDITING DONE ]    [ CANCEL ]

FEEDABLE SHEET INFORMATION

| SHEET FEED TRAY | FEEDABLE SHEET WIDTH (mm) | FEEDABLE SHEET HEIGHT (mm) | FEEDABLE SHEET GRAMMAGE (g/m$^2$) |
|---|---|---|---|
| 1 | 148~320 | 180~450 | 50~180 |
| 2 | 148~320 | 180~450 | 50~180 |
| 3 | 148~300 | 200~420 | 50~300 |
| 4 | 100~331 | 180~488 | 50~320 |
| 5 | 100~331 | 180~488 | 50~320 |
| 6 | 100~331 | 180~488 | 50~320 |
| 7 | 148~300 | 180~400 | 70~300 |
| 8 | 100~380 | 150~600 | 50~350 |
| 9 | 100~380 | 150~600 | 50~350 |

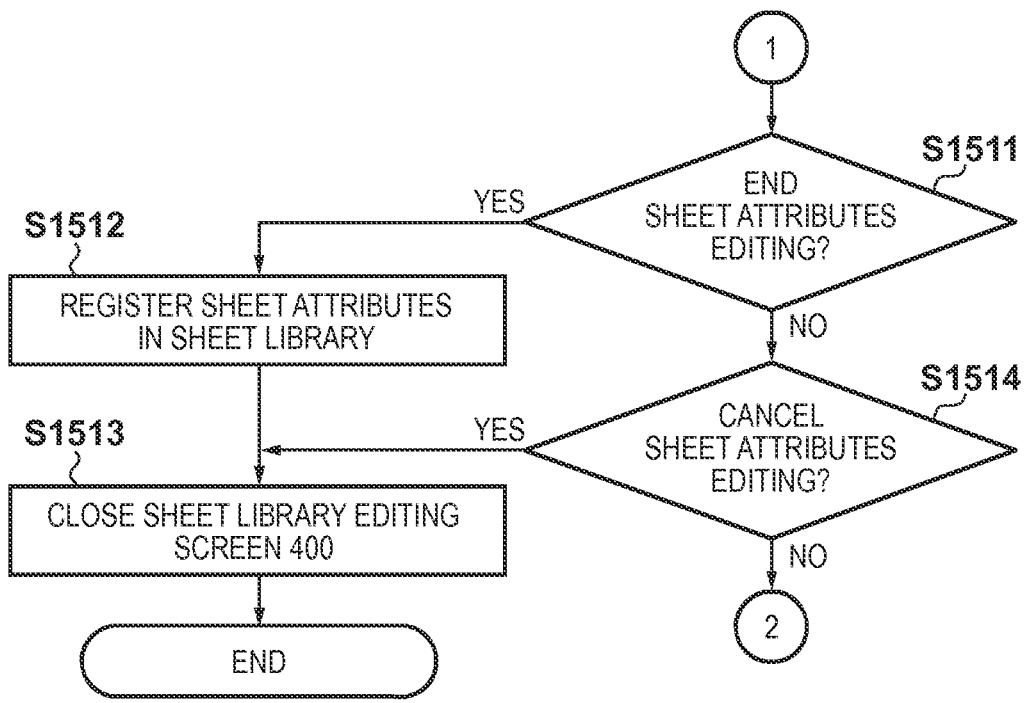
F I G. 15B

FIG. 16A

EDIT SHEET ATTRIBUTES

SHEET NAME

SHEET WIDTH (mm)

SHEET HEIGHT (mm)

GRAMMAGE (g/m$^2$)

COLOR

SHEET FEED TRAYS FOR WHICH ASSIGNMENT IS ALLOWED — 510

- 1601 ☑ SHEET FEED TRAY 1
- 1602 ☑ SHEET FEED TRAY 2
- 1603 ☑ SHEET FEED TRAY 3
- 1604 ☑ SHEET FEED TRAY 4
- 1605 ☑ SHEET FEED TRAY 5
- 1606 ☑ SHEET FEED TRAY 6
- 1607 ☑ SHEET FEED TRAY 7
- 1608 ☑ SHEET FEED TRAY 8
- 1609 ☑ SHEET FEED TRAY 9

[ EDITING DONE ]   [ CANCEL ]

EDIT SHEET ATTRIBUTES

SHEET NAME

SHEET WIDTH (mm)

SHEET HEIGHT (mm)

GRAMMAGE (g/m$^2$)

COLOR

SHEET FEED TRAYS FOR WHICH ASSIGNMENT IS ALLOWED

1611 ☑ SHEET FEED TRAY 1
1612 ☑ SHEET FEED TRAY 2
1613 ☑ SHEET FEED TRAY 3
1614 ☑ SHEET FEED TRAY 4
1615 ☑ SHEET FEED TRAY 5
1616 ☑ SHEET FEED TRAY 6
1617 ☑ SHEET FEED TRAY 7
1618 ☑ SHEET FEED TRAY 8
1619 ☑ SHEET FEED TRAY 9

EDITING DONE    CANCEL

- SHEET LIBRARY — 210
- SHEET FEED TRAY SHEET ASSIGNMENT INFORMATION — 211
- SHEET FEED TRAY CHARACTERISTIC INFORMATION — 1701

SHEET FEED TRAY CHARACTERISTIC INFORMATION

| SHEET FEED TRAY | MULTI-FEED DETECTION SENSOR 1711 | SHEET SIZE DETECTION SENSOR 1712 | AIR-FEED MECHANISM 1713 |
|---|---|---|---|
| 1 | NO | YES | NO |
| 2 | NO | NO | NO |
| 3 | NO | YES | YES |
| 4 | YES | NO | YES |
| 5 | YES | YES | YES |
| 6 | YES | NO | NO |

FIG. 18

EDIT SHEET ATTRIBUTES

| | | |
|---|---|---|
| SHEET NAME | XYZ COMPANY PAPER C081 | ~1801 |
| SHEET WIDTH (mm) | 148 | ~1802 |
| SHEET HEIGHT (mm) | 210 | ~1803 |
| GRAMMAGE (g/m$^2$) | 150 | ~1804 |
| COLOR | WHITE | ~1805 |

SHEET FEED TRAYS FOR WHICH ASSIGNMENT IS ALLOWED — 1810

- [✓] 1811 ALLOWED ONLY FOR SHEET FEED TRAY HAVING MULTI-FEED DETECTION SENSOR
- [✓] 1812 ALLOWED ONLY FOR SHEET FEED TRAY HAVING SHEET SIZE DETECTION SENSOR
- [ ] 1813 ALLOWED ONLY FOR SHEET FEED TRAY HAVING AIR-FEED MECHANISM

[ EDITING DONE ] 1820    [ CANCEL ] 1821

1800

F I G. 19

| SHEET LIBRARY 1911 | 1912 SHEET WIDTH (mm) | 1913 SHEET HEIGHT (mm) | 1914 GRAMMAGE (g/m²) | 1915 COLOR | 1916 SHEET FEED TRAYS FOR WHICH ASSIGNMENT IS ALLOWED |
|---|---|---|---|---|---|
| SHEET NAME | | | | | |
| ABC COMPANY PAPER RECYCLE 1 | 210 | 297 | 75 | WHITE | ALLOWED ONLY FOR SHEET FEED TRAY HAVING MULTI-FEED DETECTION SENSOR |
| ABC COMPANY PAPER RECYCLE 2 | 297 | 420 | 75 | WHITE | ALLOWED ONLY FOR SHEET FEED TRAY HAVING MULTI-FEED DETECTION SENSOR |
| DEF COMPANY PAPER HEAVY PAPER LTR | 216 | 279 | 150 | WHITE | NO DESIGNATION |
| DEF COMPANY PAPER NORMAL PAPER 11×17 | 279 | 432 | 80 | YELLOW | ALLOWED ONLY FOR SHEET FEED TRAY HAVING MULTI-FEED DETECTION SENSOR ALALLOWED ONLY FOR SHEET FEED TRAY HAVING SHEET SIZE DETECTION SENSOR ALLOWED ONLY FOR SHEET FEED TRAY HAVING AIR-FEED MECHANISM |
| XYZ COMPANY PAPER C081 | 148 | 210 | 105 | WHITE | ALALLOWED ONLY FOR SHEET FEED TRAY HAVING SHEET SIZE DETECTION SENSOR |
| XYZ COMPANY PAPER C082 | 210 | 297 | 105 | WHITE | ALALLOWED ONLY FOR SHEET FEED TRAY HAVING SHEET SIZE DETECTION SENSOR ALLOWED ONLY FOR SHEET FEED TRAY HAVING AIR-FEED MECHANISM |
| ABC COMPANY PAPER COATED PAPER 1 | 216 | 279 | 120 | WHITE | ALLOWED ONLY FOR SHEET FEED TRAY HAVING MULTI-FEED DETECTION SENSOR ALALLOWED ONLY FOR SHEET FEED TRAY HAVING SHEET SIZE DETECTION SENSOR |
| ABC COMPANY PAPER COATED PAPER 2 | 216 | 279 | 175 | WHITE | ALLOWED ONLY FOR SHEET FEED TRAY HAVING MULTI-FEED DETECTION SENSOR ALALLOWED ONLY FOR SHEET FEED TRAY HAVING SHEET SIZE DETECTION SENSOR |

PRINTING APPARATUS CAPABLE OF ASSIGNING A PIECE OF SHEET INFORMATION TO A FEED TRAY

BACKGROUND OF THE INVENTION

1. Field of the Invention

The present invention relates to printing apparatuses that have a plurality of sheet feed trays and that can assign sheets to those sheet feed trays, as well as to control methods thereof and storage media.

2. Description of the Related Art

In the printing market, business models known as "print on demand" (POD), "print production", and so on are being utilized, where printing is carried out upon receiving an order from a client and the resulting printed material, or an output product obtained by performing post-processing on the printed material, is delivered with certainty to the client by a deadline. At facilities where such printing is carried out, the ability to perform large amounts of printing at high speeds is extremely important. There are thus many cases where operators who specialize in performing various operations are assigned to printing apparatuses. Such operators specialize in performing operations such as inserting, replacing, and assigning sheets, managing print jobs, editing job tickets, conveying output products, performing post-processing such as trimming and binding, and the like. "Assigning sheets" as mentioned here refers to an operation for assigning sheet information that identifies sheets inserted or replaced by the operator to respective sheet feed trays in a printing apparatus. The printing apparatus determines which sheet feed tray contains which type of sheet based on the sheet information that has been assigned to the sheet feed trays in this manner. The inserting, replacement, and assigning of sheets is the most important operation performed by an operator. The reason for this is that if the sheets are not correctly inserted, replaced, and assigned, there is a possibility that the printing apparatus will be unable to print onto a designated sheet when executing a print job, will mistakenly print onto a different sheet, or the like. When such a situation occurs, the printing apparatus first stops the print engine and suspends the printing process. When the printing process is suspended in this manner, not only can the printing process not be restarted until the required sheets are inserted, replaced, and assigned, but the print engine must also undergo a reheating process and the like after the printing process has been restarted, and thus it takes a long time before the printing can be performed again (that is, there is a long downtime). In order to avoid such downtime, it is necessary for the operator to accurately insert, replace, and assign sheets in accordance with the print job that is to be executed, prior to the start of printing.

Meanwhile, client preferences are becoming more varied in recent years, and the types of sheets used in printing are also becoming more varied as a result. Accordingly, when assigning sheets to sheet feed trays, it is necessary for the operator to select the sheets to be assigned from among many different types of sheets, resulting in an increased likelihood of operational mistakes. To handle such a situation, a method that narrows down assignable sheet candidates based on the print job that is to be executed has been proposed. For example, according to Japanese Patent Laid-Open No. 2004-330781, only sheets that are used by the print job to be executed are displayed as assignment candidates, and thus the likelihood that the operator will mistakenly assign the sheets can be reduced. Meanwhile, according to a method disclosed in Japanese Patent Laid-Open No. 2008-055787, sheet types that cannot be fed by a sheet feed tray are deleted from assignment candidates that are displayed, and thus the likelihood that the operator will mistakenly assign the sheets to a sheet feed tray can be reduced.

According to the stated background art documents, sheets that serve as assignment candidates can be automatically narrowed down based on set conditions. However, in actual printing facilities, there are cases where operations unique to the printing facility are specified in addition to such conditions, and the sheets contained in the sheet feed trays are limited as a result. For example, there are cases where labels identifying sheets that can be contained in sheet feed trays are applied to the front surfaces of those sheet feed trays, and the operator inserts the sheets by referring to the labels. This makes it possible to reduce the likelihood of the operator inserting the incorrect sheets into the sheet feed trays. However, after the sheets have been inserted into the sheet feed tray, sheets aside from those identified by the label are to be displayed as assignment candidates when assigning the sheet information to the sheet feed tray, and thus there is still a chance that the operator will make an assignment mistake.

SUMMARY OF THE INVENTION

The present invention eliminates the above-mentioned conventional problems. It is a feature of the present invention to provide a printing apparatus capable of lightening a burden on an operator when assigning sheets to a sheet feed tray and reducing the likelihood of the operator making an assignment mistake, and to provide a control method for such a printing apparatus.

According to one aspect of the present invention, there is provided a printing apparatus having a plurality of sheet feed trays, the apparatus comprising: a storage unit configured to store sheet information including property information indicating a property of a sheet and sheet feed tray information indicating a sheet feed tray to which the sheet is allowed to be assigned; a selection unit configured to select a sheet feed tray from the plurality of sheet feed trays based on a designation made by a user; a display unit configured to display a sheet allowed to be assigned to the sheet feed tray selected by the selection unit based on the sheet information stored in the storage unit; and an assignment unit configured to assign, to the sheet feed tray selected by the selection unit, a sheet designated by the user from among sheets displayed by the display unit.

According to another aspect of the present invention, there is provided a control method that controls a printing apparatus having a plurality of sheet feed trays, the method comprising steps of: storing, in a memory, sheet information including property information indicating a property of a sheet and sheet feed tray information indicating a sheet feed tray to which the sheet is allowed to be assigned; selecting a sheet feed tray from the plurality of sheet feed trays based on a designation made by a user; displaying a sheet allowed to be assigned to the sheet feed tray selected in the selecting step based on the sheet information stored in the memory; and assigning, to the sheet feed tray selected in the selecting step, a sheet designated by the user from among sheets displayed in the displaying step.

According to still another aspect of the present invention, there is provided a computer-readable storage medium storing a computer program for causing a computer to execute steps of a method for controlling the printing apparatus, the method comprising steps of: storing, in a memory, sheet information including property information indicating a property of a sheet and sheet feed tray information indicating a sheet feed tray to which the sheet is allowed to be assigned;

selecting a sheet feed tray from the plurality of sheet feed trays based on a designation made by a user; displaying a sheet allowed to be assigned to the sheet feed tray selected in the selecting step based on the sheet information stored in the memory; and assigning, to the sheet feed tray selected in the selecting step, a sheet designated by the user from among sheets displayed in the displaying step.

According to the present invention, the likelihood of an operator making an assignment mistake when assigning sheets to a sheet feed tray can be reduced.

Further features of the present invention will become apparent from the following description of exemplary embodiments (with reference to the attached drawings).

BRIEF DESCRIPTION OF THE DRAWINGS

FIG. 3A is a diagram illustrating an example of a sheet library according to the first embodiment.

FIG. 3B is a diagram illustrating an example of sheet feed tray sheet assignment information according to the first embodiment.

FIG. 4 is a diagram illustrating an example of a screen through which an operator edits the sheet library in the printing system according to the first embodiment.

FIG. 5 is a diagram illustrating an example of a screen through which an operator edits sheet attributes in the printing system according to the first embodiment.

FIG. 7 is a diagram illustrating an example of an assignment settings screen through which an operator assigns contained sheets to a pre-selected sheet feed tray in the printing system according to the first embodiment.

FIG. 8 is a flowchart illustrating operations performed by a sheet assignment setting unit in the printing apparatus according to the first embodiment.

FIGS. 9A, 9B, and 9C are diagrams illustrating examples of lists of sheets whose assignment to a selected sheet feed tray is allowed, according to the first embodiment.

FIGS. 12A and 12B are diagrams illustrating a state in which a sheet feed tray to which a sheet can be assigned has been changed by editing sheet attributes of that sheet, in the printing apparatus according to the second embodiment.

FIGS. 15A and 15B are flowcharts illustrating operations performed by a sheet library editing unit in the printing apparatus according to the third embodiment.

FIGS. 16A and 16B are diagrams illustrating how a sheet attributes editing screen for editing sheet attributes is displayed to an operator according to the third embodiment.

FIG. 18 is a diagram illustrating an example of a screen through which an operator edits sheet attributes in the printing system according to the fourth embodiment.

FIG. 19 is a diagram illustrating an example of a sheet library saved in the printing apparatus according to the fourth embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
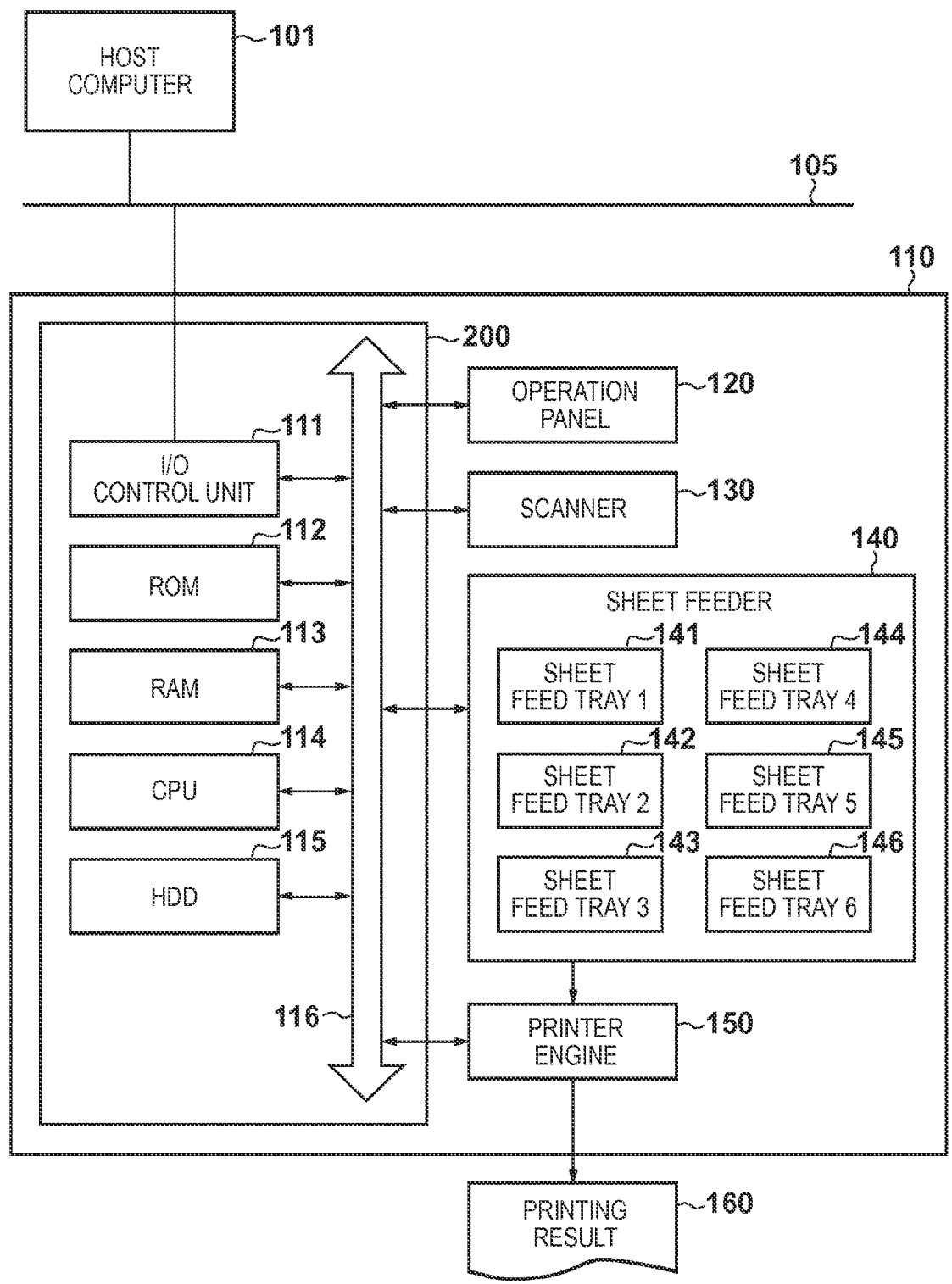
FIG. 1 is a block diagram illustrating the configuration of a printing system according to a first embodiment of the present invention.

FIG. 1 is a block diagram illustrating the configuration of a printing system according to a first embodiment of the present invention. Note that as long as the functions of the present embodiment can be executed, the system may be a system in which processing is carried out by devices connected via a network such as a LAN or a WAN.

The printing system according to the present embodiment includes a host computer 101 and a printing apparatus 110, and the host computer 101 and the printing apparatus 110 are connected to each other by a communication line 105. Note that a plurality of host computers, printing apparatuses, and so on may be connected in this printing system. The host computer 101 obtains input information from a user through an input device (not shown), generates a print job to be sent to the printing apparatus 110, and sends the print job to the printing apparatus 110.

Next, the configuration of the printing apparatus 110 will be described. The printing apparatus 110 according to the present embodiment is a multifunction apparatus including a printing function, a copy function, a fax function, a scan function, and so on; however, the printing apparatus 110 may be a printing apparatus having only a printing function. A control unit 200 controls the operations of the printing apparatus 110 by performing various types of data processes. An operation panel 120 accepts various types of operations from the user through a touch panel system. A scanner 130 obtains image data of a document by scanning and reading the document using an optical sensor. A sheet feeder 140 includes a plurality of sheet feed trays, and conveys sheets to a printer engine 150 by feeding those sheets from a designated sheet feed tray. The printer engine 150 prints an image onto a sheet fed from the sheet feeder 140 based on image data. Note that reference numeral 160 indicates a printing result (printed material) obtained through the printing.

Next, the configuration of the control unit 200 will be described. An I/O control unit 111 controls communication with an external network. A ROM 112 stores various types of control programs. A RAM 113 is used to store the control programs stored in the ROM 112 when executing those programs. The RAM 113 also functions as a main memory or a working memory for a CPU 114. The CPU 114 performs overall control of various devices by executing control programs loaded in the RAM 113. An HDD 115 holds large pieces of data, such as image data, print data, and the like, temporarily or for long periods of time. The aforementioned elements are connected to each other via a system bus 116. Furthermore, the system bus 116 connects the control unit 200 to the respective devices, such as the operation panel 120, the scanner 130, and so on. Note that control programs and an operating system may be stored in the HDD 115 in addition to the ROM 112.

The sheet feeder 140 includes the plurality of sheet feed trays. In addition to the sheet feed trays provided in the printing apparatus 110 itself, the sheet feeder 140 may include, as optional items, sheet feed trays such as an external sheet feed tray, a manual sheet feeder, or the like. In the present embodiment, a total of six sheet feed trays consisting of a sheet feed tray 141 to a sheet feed tray 146 (respectively called sheet feed trays 1 to 6 hereinafter) are present. Each sheet feed tray is capable of containing a plurality of printing sheets, and each sheet feed tray separates the topmost of the sheets contained therein and conveys that sheet to the printer engine 150.

Figure 2A:
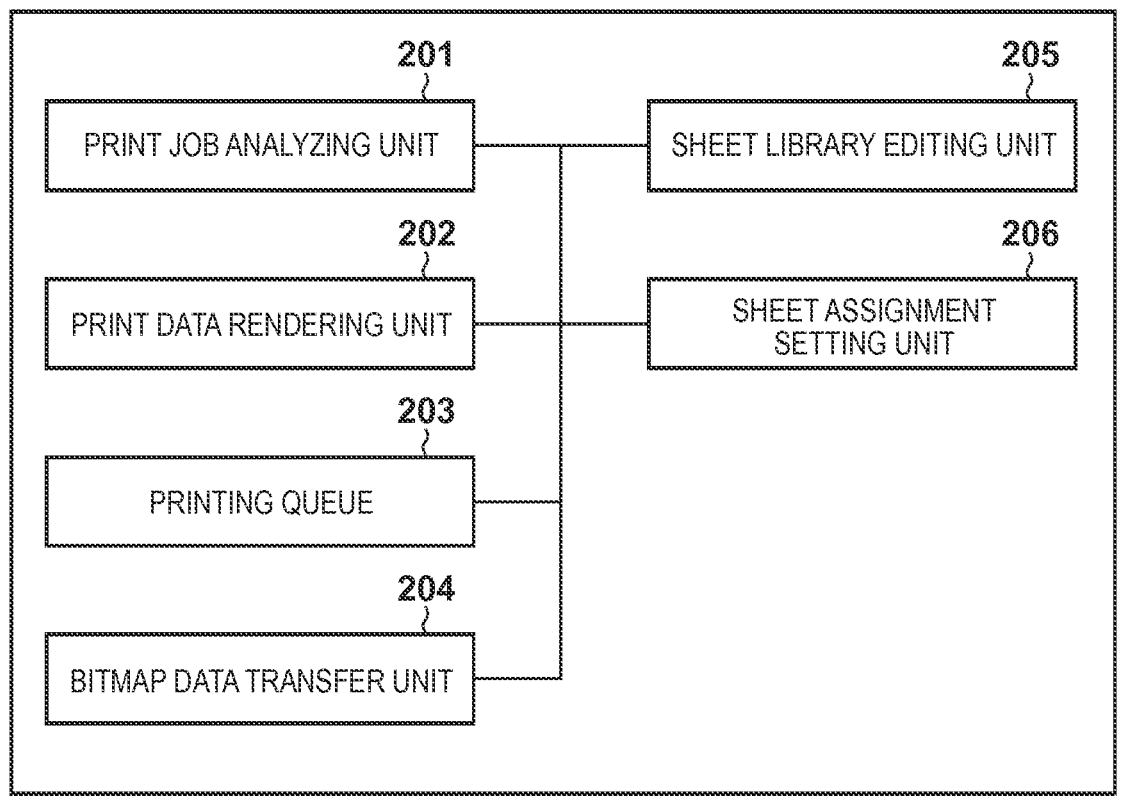
FIG. 2A is a functional block diagram illustrating the software module configuration of a printing apparatus according to the first embodiment.

FIG. 2A is a functional block diagram illustrating the software module configuration of the printing apparatus 110 according to the first embodiment. These software modules are stored in the ROM 112 or the HDD 115, and are implemented by the CPU 114 executing programs that have been loaded in the RAM 113.

A print job analyzing unit 201 analyzes various types of print jobs accepted from the printing apparatus 110, such as print jobs sent from the host computer 101, copy jobs generated by the printing apparatus 110, and so on, and reads out printing settings included in those print jobs. The "printing settings" referred to here primarily indicate information regarding sheet feeding, such as a size and type of the sheet used in printing, the sheet feed tray, and the like, information regarding single-sided or double-sided printing, as well as information regarding finishing processes such as stapling, binding settings, and so on. The printing settings read out by the print job analyzing unit 201 are temporarily saved in a storage device such as the RAM 113 or the HDD 115.

A print data rendering unit 202 renders image data included in the various print jobs accepted by the printing apparatus 110 as bitmap data that can be printed by the printer engine 150. Image data sent from the host computer 101 is normally written in page description language (PDL) or the like, and that PDL data is rendered as bitmap data. Note that in the case where the image data has been rendered as bitmap data in advance by the host computer 101 or the like, the print data rendering unit 202 performs a color conversion process for converting that image data into a color space compliant with the printer engine 150. Meanwhile, in the case of a copy job generated by the printing apparatus 110, the scanned image data read by the scanner 130 is rendered as bitmap data. The bitmap data generated by the print data rendering unit 202 is temporarily saved in a storage device such as the RAM 113 or the HDD 115.

All print jobs accepted by the printing apparatus 110 are processed by the print job analyzing unit 201 and the print data rendering unit 202, and the information thereof is sent to a printing queue 203 and managed collectively. The printing queue 203 controls a printing order of the print jobs that are managed, and advances printing processes in accordance with a predetermined order. A bitmap data transfer unit 204 transfers the bitmap data generated by the print data rendering unit 203 to the printer engine 150 at a timing at which a sheet is conveyed from the sheet feeder 140 to the printer engine 150.

A sheet library editing unit 205 edits a sheet library. The "sheet library" referred to here is a database that manages sheet information (sheet property information) of all of the sheets handled by the printing apparatus 110. Sheet information such as types, properties, and so on of sheets that are generally used is registered in the sheet library in advance, when the printing apparatus 110 is shipped. It is also possible for an operator or the like to add, delete, and edit the sheet information as necessary. A sheet assignment setting unit 206 assigns the sheet information of the sheets contained in the respective sheet feed trays in the sheet feeder 140 to those sheet feed trays. The sheet information that is assigned here is selected by the operator from the sheet library.

Figure 2B:
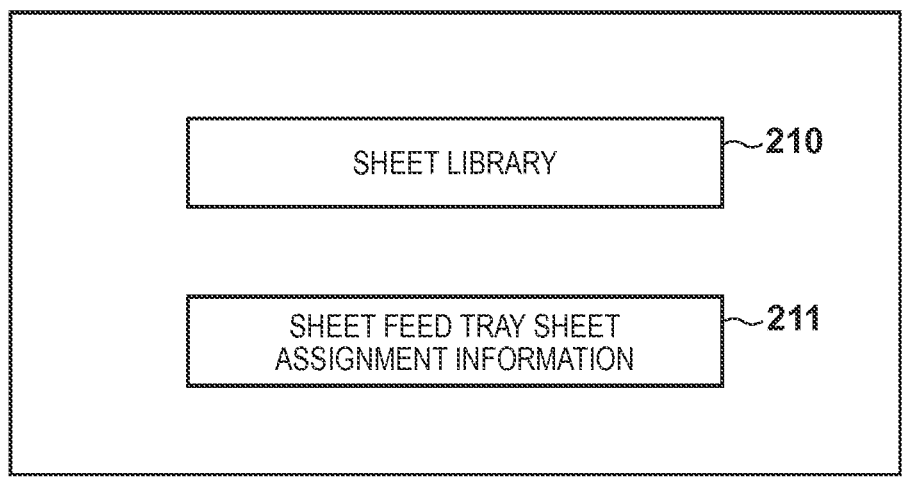
FIG. 2B is a diagram illustrating setting information that is saved in the printing apparatus and that sets sheet information in respective sheet feed trays, according to the first embodiment.

FIG. 2B is a diagram illustrating setting information that is saved in the printing apparatus 110 and that sets sheet information in the respective sheet feed trays, according to the first embodiment. This setting information is saved in the HDD 115, and is read out and written by the respective software modules as necessary.

The detailed configuration of a sheet library 210 will be described later with reference to FIG. 3A. Sheet feed tray sheet assignment information 211 stores the sheet information that has been assigned to the respective sheet feed trays. The details of this sheet feed tray sheet assignment information 211 will be given later with reference to FIG. 3B.

FIG. 3A is a diagram illustrating an example of the sheet library 210 according to the first embodiment. Although a schematic diagram is used for the descriptions here, the sheet library 210 is actually saved as digital information in a format such as XML, CSV, or the like.

Reference numerals 301 to 308 indicate information of the respective sheets saved in the sheet library 210. Reference numerals 311 to 316 indicate sheet attributes designated for the respective sheets by the operator or the like. Reference numerals 311 to 315 indicate a sheet name, a sheet width, a sheet height, a grammage, and a color, respectively. Meanwhile, 316 indicates the sheet feed trays to which the sheets are allowed to be assigned, on a sheet-by-sheet basis. In this manner, the sheet library 210 registers attribute information, as well as information indicating whether or not a sheet can be assigned to each sheet feed tray in the printing apparatus 110, for each type of sheet that is commercially available.

FIG. 3B is a diagram illustrating an example of the sheet feed tray sheet assignment information 211 according to the first embodiment. Although a schematic diagram is used for the descriptions here, the sheet feed tray sheet assignment information 211 is actually saved as digital information in a format such as XML, CSV, or the like.

Here, the sheets assigned to the respective sheet feed trays 1 to 6 are identified by sheet names assigned to those sheet feed trays. Although the sheet name is used here as the information for identifying the sheets assigned to the respective sheet feed trays, the information is not limited to the sheet name, and any information that enables the sheet to be identified, such as special sheet IDs allocated to the respective sheets, may be used. Note also that in FIG. 3A and FIG. 3B, the sheets that can be assigned to the respective sheet feed trays in FIG. 3A correspond to the sheets that are actually assigned to the respective sheet feed trays in FIG. 3B.

The flow of processing when the operator assigns sheets to the respective sheet feed trays in a printing system having such a configuration will now be described.

FIG. 4 is a diagram illustrating an example of a screen through which the operator edits the sheet library 210 in the printing system according to the first embodiment.

Reference numeral 400 indicates an overall sheet library editing screen. The sheet library editing screen 400 is generated by the CPU 114 executing the function of the sheet library editing unit 205, and is displayed in the operation panel 120. A sheet list 410 displays a list of the sheets stored in the sheet library 210. In the sheet list 410, sheet attributes such as those indicated by columns 411 to 415 are presented to the operator as associated information, for each of the sheets. The column 411 indicates the names of the respective sheets. The sheet names are names designated by the operator or the like in order to distinguish the respective sheets from each other. The columns 412 and 413 indicate the width and height, respectively, of the respective sheets. The column 414 indicates the grammages of the respective sheets. The column 415 indicates the colors of the respective sheets. Meanwhile, by touching an area of the sheet list 410 where a sheet is displayed in the operation panel 120, that sheet can be selected. The selected sheet is highlighted and displayed (displayed with inverted colors). As an example, FIG. 4 illustrates a case where "DEF COMPANY PAPER HEAVY LTR" is selected. In addition, a scrollbar 416 is used in the case where the number of sheets registered in the sheet library 210 is greater than the number of sheets that can be displayed at once in the sheet list 410. By manipulating the scrollbar 416, the operator can scroll through and display the information of the sheets in the sheet list 410, and can select a desired sheet.

An add new button 420 is a button for newly adding a sheet to the sheet library 210. An edit button 421 is a button for editing the sheet attributes of a sheet selected in the sheet list 410. When the add new button 420 or the edit button 421 is pressed, a sheet attributes editing screen such as that shown in FIG. 5 is displayed. A delete button 423 is a button for deleting the selected sheet in the sheet list 410 from the sheet library 210.

FIG. 5 is a diagram illustrating an example of a screen through which the operator edits the sheet attributes in the printing system according to the first embodiment.

Reference numeral 500 indicates the overall editing screen. The sheet attributes editing screen 500 is generated by the CPU 114 executing the function of the sheet library editing unit 205, and is displayed in the operation panel 120. Reference numerals 501 to 505 indicate text boxes for inputting the sheet attributes of the sheet name, the sheet width, the sheet height, the grammage, and the color. The input in these text boxes is carried out using a software keyboard (not shown), a numerical keypad provided in the operation panel 120, or the like. Reference numeral 510 indicates a check box group for designating sheet feed trays to which sheets can be assigned, and the check box group includes check boxes 511 to 516 that correspond to the respective sheet feed trays. The check boxes 511 to 516 respectively indicate whether or not the sheet that is currently being edited is allowed to be assigned to the sheet feed tray 1 to the sheet feed tray 6. Here, a check box being checked indicates that the sheet currently being edited is allowed to be assigned to that sheet feed tray. In FIG. 5, the sheet currently being edited (XYZ COMPANY PAPER C081) is set to be allowed to be assigned to the sheet feed tray 1, the sheet feed tray 2, and the sheet feed tray 5. When an editing done button 520 is pressed, the sheet attributes input at that point in time are finalized and saved in the sheet library 210. After this, the sheet attributes editing screen 500 is closed and the screen returns to the sheet library editing screen 400. When a cancel button 521 is pressed, the process of editing the sheet attributes is stopped, the sheet attributes editing screen 500 is closed, and the screen returns to the sheet library editing screen 400.

Figure 6:
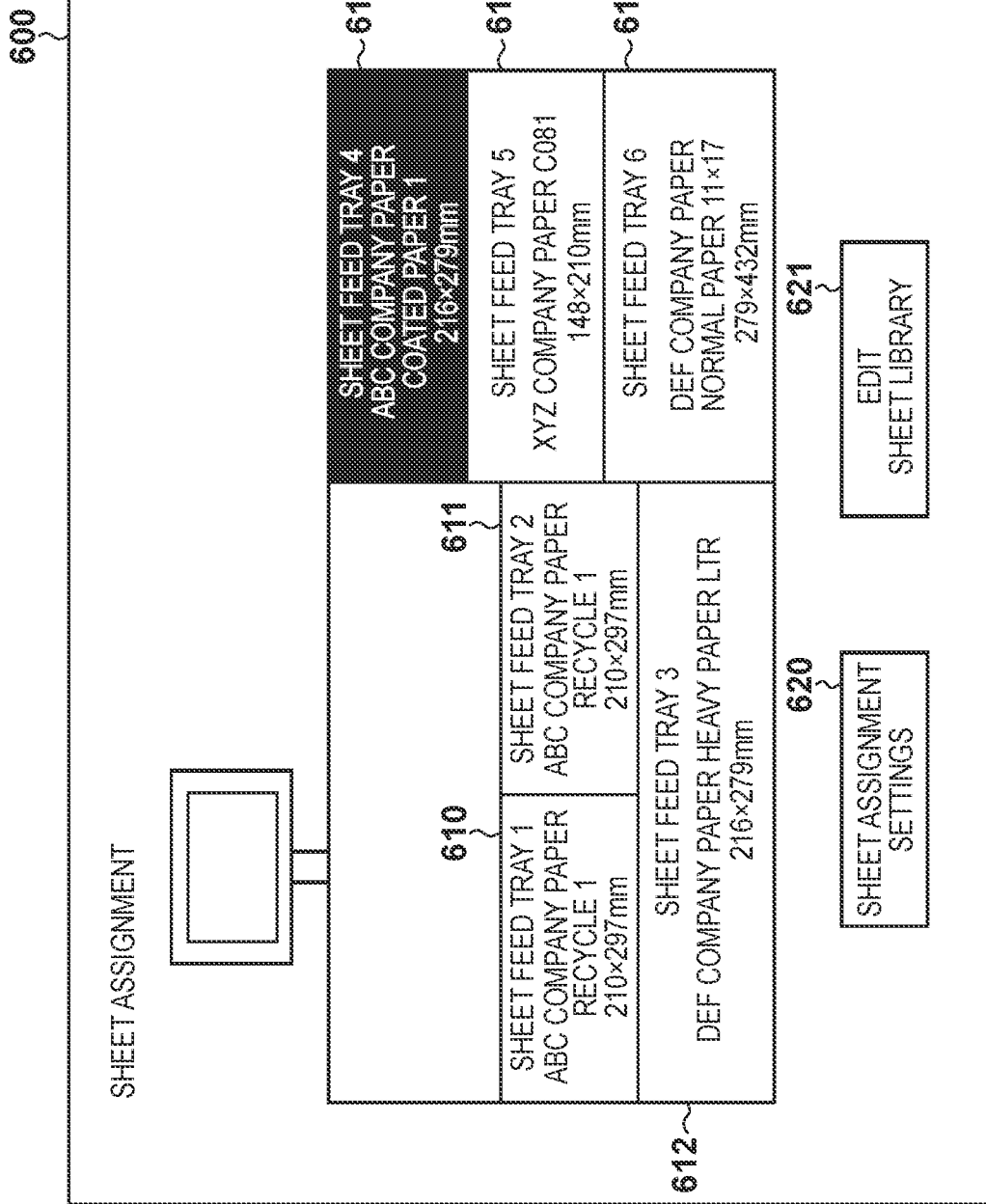
FIG. 6 is a diagram illustrating an example of a sheet assignment screen through which an operator assigns sheets contained in respective sheet feed trays to the respective sheet feed trays in the printing system according to the first embodiment.

FIG. 6 is a diagram illustrating an example of a sheet assignment screen through which the operator assigns the sheets contained in the respective sheet feed trays to the respective sheet feed trays in the printing system according to the first embodiment.

Reference numeral 600 indicates the overall sheet assignment screen. The sheet assignment screen 600 is generated by the CPU 114 executing the function of the sheet assignment setting unit 206, and is displayed in the operation panel 120. Reference numerals 610 to 615 are sheet feed tray information display sections that display information identifying the sheets assigned to the respective sheet feed trays 1 to 6. The sheet feed tray information display sections 610 to 615 are displayed so as to correspond to the physical locations of the respective sheet feed trays in the printing apparatus 110. The sheet name and sheet size are displayed in the sheet feed tray information display sections 610 to 615, as information respectively identifying the sheets currently assigned to the sheet feed trays. Here, the operator can select a desired sheet feed tray by touching areas in which the sheet feed tray information display sections 610 to 615 are displayed. The selected sheet feed tray is highlighted and displayed (displayed with inverted colors). In FIG. 6, the sheet feed tray 4 is selected, and the sheet feed tray information display section 613 of the sheet feed tray 4 is displayed with inverted colors.

A sheet assignment settings button 620 is a button through which the operator starts assigning a sheet to a selected sheet feed tray. When the sheet assignment settings button 620 is pressed, a sheet assignment settings screen 700 such as that shown in FIG. 7 is displayed. When an edit sheet library button 621 is pressed, the sheet library editing screen 400 for editing the sheet library 210, shown in FIG. 4, is displayed.

FIG. 7 is a diagram illustrating an example of a sheet assignment settings screen through which the operator assigns contained sheets to a pre-selected sheet feed tray in the printing system according to the first embodiment.

Reference numeral 700 indicates the overall assignment settings screen. The assignment settings screen 700 is generated by the CPU 114 executing the function of the sheet assignment setting unit 206, and is displayed in the operation panel 120. A sheet list 710 displays a list of the sheets stored in the sheet library 210 that can be assigned to a selected sheet feed tray. FIG. 7 illustrates a sheet assignment settings screen for a case where the sheet feed tray 1 has been selected. In the sheet list 710, sheet attributes such as those indicated by columns 711 to 715 are displayed for the operator as associated information, for each of the sheets. The column 711 indicates the names of the respective sheets. The columns 712 and 713 indicate the width and height, respectively, of the respective sheets. The column 714 indicates the grammages of the respective sheets. The column 715 indicates the colors of the respective sheets.

Meanwhile, by touching an area of the sheet list 710 where a sheet is displayed in this screen using the operation panel 120, the operator can select that sheet. Although the selected sheet is highlighted and displayed (displayed with inverted colors), the sheet may be indicated by a cursor. FIG. 7 shows a state in which "XYZ COMPANY PAPER C081" is selected. In addition, a scrollbar 716 is used in the case where the number of sheets to be displayed in the sheet list 710 is greater than the number of sheets that can be displayed at one time in the sheet list 710. By manipulating the scrollbar 716, the operator can scroll through the attribute information of the sheets in the sheet list 710, and can select a desired sheet.

When a settings button 720 is pressed, the sheet currently selected in the sheet list 710 can be finalized as the sheet assigned to the pre-selected sheet feed tray. In the example shown in FIG. 7, "XYZ COMPANY PAPER C081" is assigned to the sheet feed tray 1. As a result, the sheet assignment setting unit 206 updates the sheet feed tray sheet assignment information 211, closes the assignment settings screen 700, and returns to the sheet assignment screen 600 shown in FIG. 6. A cancel button 721 is pressed in order to cancel the assignment of sheets to the pre-selected sheet feed tray. In this case, the sheet assignment setting unit 206 closes the assignment settings screen 700 and returns to the sheet assignment screen 600 shown in FIG. 6 without updating the assignment information for the sheet feed tray.

In this manner, with the printing apparatus 110 according to the first embodiment, the sheets used by the printing apparatus 110 are registered in the sheet library 210 in advance, and when the operator selects a sheet feed tray, only the sheets that are allowed to be assigned to that sheet feed tray are displayed. The sheet to be assigned to that sheet feed tray can then be selected from the sheet list that is displayed, and assigned. This eliminates the possibility of mistakenly assigning sheets that are not originally allowed to be assigned to the selected sheet feed tray.

FIG. 8 is a flowchart illustrating operations performed by the sheet assignment setting unit 206 in the printing apparatus according to the first embodiment. This process is implemented by the CPU 114 executing programs that have been loaded in the RAM 113.

First, in S801, the CPU 114 displays the sheet assignment screen 600 shown in FIG. 6 in the operation panel 120. The process then advances to S802, where the CPU 114 stands by for the operator to select a sheet feed tray using the sheet assignment screen 600. In other words, the CPU 114 stands by for the sheet assignment settings button 620 to be pressed in the sheet assignment screen 600 shown in FIG. 6. When the sheet assignment settings button 620 is pressed, the process advances to S803, where the CPU 114 starts generating the sheet list to be displayed in the sheet assignment settings screen 700 shown in FIG. 7. Here, in S803, the CPU 114 first selects a single sheet in the sheet library 210 and confirms the sheet attributes of the selected sheet. Then, in S804, the CPU 114 determines whether or not assigning the sheet to the sheet feed tray selected in S802 is allowed. In the case where the sheet is allowed to be assigned, the process advances to S805, where the sheet is added to the sheet list; the process then advances to S806.

On the other hand, in the case where the CPU 114 cannot assign the sheet to the selected sheet feed tray in S804, the process advances to S806. In S806, the CPU 114 checks whether the processes of S803 to S805 have ended for all of the sheets saved in the sheet library 210; in the case where the processes are not complete, the CPU 114 returns the process to S803 and continues the aforementioned processing. When the confirmation processing of S803 to S805 has ended for all of the sheets saved in the sheet library 210, the process advances to S807, where the sheet assignment settings screen 700 such as that shown in FIG. 7 is displayed for the operator. Here, the sheet list generated in S803 to S806 is displayed in the sheet list 710.

The process then advances to S808, where the CPU 114 stands by for the operator to select a desired sheet from the sheet list 710. In other words, the CPU 114 stands by for the settings button 720 to be pressed in the sheet assignment settings screen 700. Here, for descriptive purposes, it is assumed that a sheet has been selected and that the operator has not canceled the operation part way through. As a result, the process advances to S809, where the CPU 114 finalizes the selected sheet as the sheet assigned to the sheet feed tray selected in S802 and updates the sheet feed tray sheet assignment information 211. The series of sheet assignment processes then ends.

Hereinafter, additional descriptions of the sheet list displayed in the sheet assignment settings screen 700 will be given using a specific example, based on the flowchart shown in FIG. 8. Note that it is assumed that the sheet library 210 is the sheet library shown in FIG. 3A.

FIGS. 9A to 9C are diagrams illustrating examples of the display of a list of the sheets that are allowed to be assigned to a selected sheet feed tray in the first embodiment.

FIG. 9A illustrates a sheet list displayed in the sheet assignment settings screen 700 in S807 when the sheet feed tray 1 has been selected in S802 of FIG. 8. In the sheet library 210 shown in FIG. 3A, the sheets that can be assigned to the sheet feed tray 1 are "ABC COMPANY PAPER RECYCLE 1", "ABC COMPANY PAPER RECYCLE 2", "XYZ COMPANY PAPER C081", and "XYZ COMPANY PAPER C082". Accordingly, only these four types of sheets are displayed in the sheet list, as shown in FIG. 9A.

FIG. 9B illustrates a sheet list displayed in the sheet assignment settings screen 700 in S807 when the sheet feed tray 3 has been selected in S802 of FIG. 8. In the sheet library 210 shown in FIG. 3A, the only sheet that can be assigned to the sheet feed tray 3 is "DEF COMPANY PAPER HEAVY PAPER LTR". Accordingly, only this one type of sheet is displayed in the sheet list, as shown in FIG. 9B.

FIG. 9C illustrates a sheet list displayed in the sheet assignment settings screen 700 in S807 when the sheet feed tray 5 has been selected in S802 of FIG. 8. In the sheet library 210 shown in FIG. 3A, the sheets that can be assigned to the sheet feed tray 5 are "XYZ COMPANY PAPER C081", "XYZ COMPANY PAPER C082", and "ABC COMPANY PAPER COATED PAPER 2". Accordingly, only these three types of sheets are displayed in the sheet list, as shown in FIG. 9C.

According to the first embodiment as described thus far, the sheet feed trays to which sheets are allowed to be assigned are set for sheets registered in a sheet library, and only the sheets that are allowed to be assigned are presented as choices to an operator when assigning the sheets to the sheet feed trays. Accordingly, when assigning sheets to a sheet feed tray, a mistake in which the operator mistakenly assigns a sheet that cannot be set for a sheet feed tray to that sheet feed tray can be prevented.

Second Embodiment

The aforementioned first embodiment makes it possible to set whether or not to allow sheets to be assigned for all of the sheet feed trays in the sheet feeder. However, it is often the case that different sheet feed trays have unique restrictions with respect to the sheets that can be fed therefrom. For example, a sheet feed tray has physical restrictions in terms of the size (width, height, and so on) of the sheets that can be contained therein, and thus a sheet feed tray cannot contain sheets that are greater than or equal to a given size. Conversely, if the sheet is less than a given size, there are cases where the sheet can be contained but cannot be fed. Such sheet size restrictions differ from sheet feed tray to sheet feed tray, depending on the physical dimensions, the conveyance capabilities, and so on of the sheet feed trays. In addition, there are cases where sheets that exceed a given value for sheet attributes such as the sheet grammage, surface property, and thickness cannot be fed, and these conditions also differ from sheet feed tray to sheet feed tray. Aside from physical restrictions of the sheet feed trays, there are also cases where makers limit the attributes of sheets that can be assigned to sheet feed trays in order to prevent damaging printing apparatuses, from the standpoint of quality assurance.

The second embodiment describes an example in which, in the case where a sheet cannot be fed due to attributes of that sheet designated by an operator, the operator is notified that settings for allowing the sheet to be assigned as specified in the first embodiment have been invalidated. The present embodiment will describe only areas that are different from the first embodiment, and identical configurations will be assigned the same reference numerals as in the first embodiment. In addition, the overall hardware configuration and software module configuration of a printing system according to the present embodiment are the same as those illustrated in FIG. 1, FIG. 2A, and FIG. 2B.

Figures 10A, 10B:
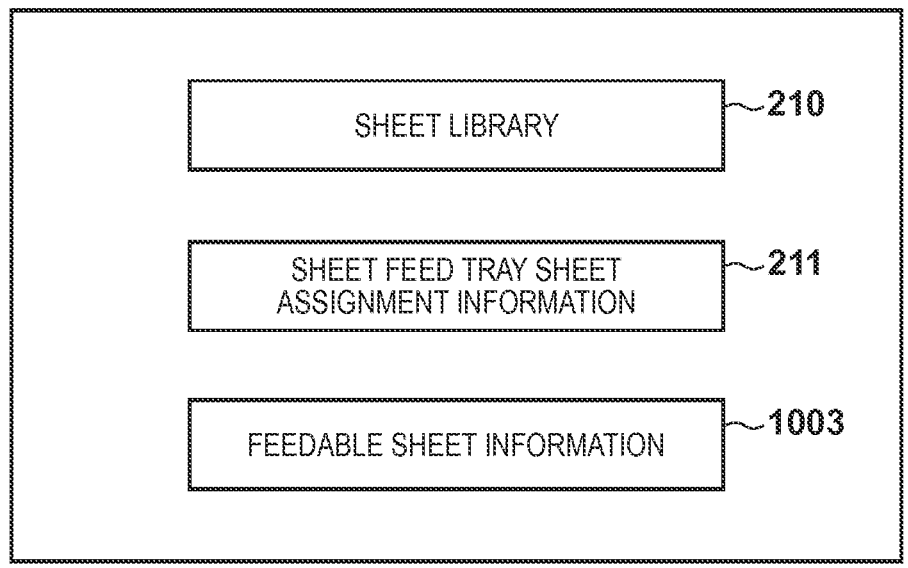
FIG. 10A is a diagram illustrating setting information that is saved in a printing apparatus according to a second embodiment.
FIG. 10B is a diagram illustrating feedable sheet information that is saved in the printing apparatus according to a second embodiment.

FIG. 10A is a diagram illustrating setting information that is saved in the printing apparatus 110 according to the second embodiment. This setting information is saved in the HDD 115, and is read out and written by the respective software modules as necessary. Note that areas that are the same as in FIG. 2B are given the same reference numerals.

Feedable sheet information 1003 holds information of the sheet attributes of sheets that can be fed for each sheet feed tray, and is saved in the printing apparatus 110 when the printing apparatus 110 is shipped. This feedable sheet information 1003 may be provided as information for the hardware of the respective sheet feed trays, and the information may then be collected from the sheet feed trays when the printing apparatus 110 is started up. The detailed structure of the feedable sheet information 1003 will be described with reference to FIG. 10B.

FIG. 10B is a diagram illustrating the feedable sheet information that is saved in the printing apparatus 110 according to the second embodiment. This setting information is saved in the HDD 115, and is read out by the respective software modules as necessary.

Reference numerals 1011 to 1016 respectively indicate information of sheet attributes of sheets that can be fed by each sheet feed tray. Reference numeral 1021 indicates a width range of sheets that can be fed by that sheet feed tray. Reference numeral 1022 indicates a height range of sheets that can be fed by that sheet feed tray. Reference numeral 1023 indicates a grammage range of sheets that can be fed by that sheet feed tray. The numerical values shown in FIG. 10B indicate that a sheet can be fed if that sheet is within the range shown. Here, it is determined that a sheet cannot be fed by a sheet feed tray if any of the sheet width, sheet height, and grammage factors are not within the feedable range. Although FIG. 10B shows the sheet width, the sheet height, and the grammage as the three factors for determining whether or not the sheet can be fed, other sheet attributes, such as the surface property, the thickness, or the like, may be added as well. Alternatively, whether or not a sheet can be fed may be determined based only on the sheet width and the sheet height.

A flow of processing when the operator edits the sheet attributes in a printing system having such a configuration will now be described.

Figure 11:
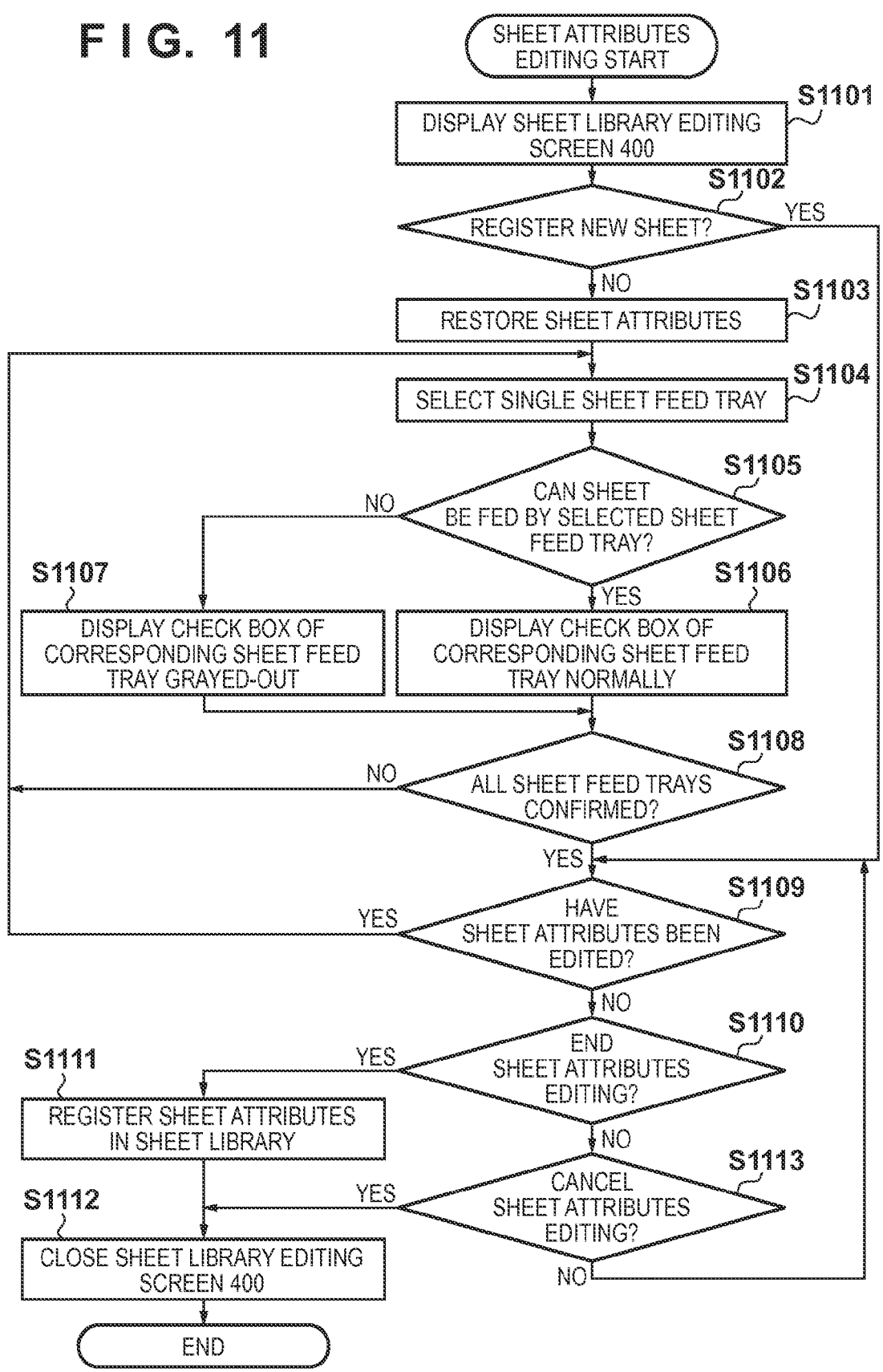
FIG. 11 is a flowchart illustrating operations performed by a sheet library editing unit in the printing apparatus according to the second embodiment.

FIG. 11 is a flowchart illustrating operations performed by the sheet library editing unit 205 in the printing apparatus according to the second embodiment. This process is implemented by the CPU 114 executing programs that have been loaded in the RAM 113.

First, in S1101, the CPU 114 displays the sheet library editing screen 400 shown in FIG. 4. The process then advances to S1102, where the CPU 114 determines whether the sheet to be edited is a sheet that will be newly registered or is an existing sheet. In other words, if the editing of the sheet attributes has been started by the add new button 420 of the sheet library editing screen 400 being pressed, the sheet to be edited is a new sheet. On the other hand, if the editing of the sheet attributes has been started by the edit button 421 being pressed, the sheet to be edited is an existing sheet. Here, in the case where the sheet to be edited is a new sheet, the process advances to S1109. On the other hand, in the case where the sheet to be edited is an existing sheet, the process advances to S1103, where the CPU 114 restores the sheet attributes of that existing sheet to the sheet attributes editing screen 500. Here, "restore" refers to displaying the sheet attributes of the existing sheet (that is, the sheet selected in the sheet library editing screen 400) in the sheet attributes editing screen 500. The sheet attributes for the existing sheet are obtained by the CPU 114 referring to the sheet library 210.

The process then advances to S1104, where the CPU 114 selects a single sheet feed tray from among the sheet feed trays mounted in the printing apparatus 110. The process then advances to S1105, where the CPU 114 determines whether or not the sheet corresponding to the sheet attributes restored in S1103 can be fed by the sheet feed tray selected in S1104. Here, whether or not the sheet can be fed can be determined by comparing the feedable sheet size and grammage obtained by referring to the feedable sheet information 1003 with the sheet size and grammage of the sheet that is currently being edited. If the sheet attributes currently being edited are within the ranges of the sheet size and grammage stored in the feedable sheet information 1003, it is determined that that sheet can be fed. In the case where it has been determined in S1105 that the sheet can be fed, the process advances to S1106, where the CPU 114 displays a check box for the corresponding sheet feed tray normally. On the other hand, in the case where it has been determined in S1105 that the sheet cannot be fed, the process advances to S1107, where the CPU 114 displays the check box for the corresponding sheet feed tray in a grayed-out manner. Examples of the normal display and the grayed-out display will be given later with reference to FIG. 12A and FIG. 12B.

After S1106 or S1107 is executed, the process advances to S1108, where the CPU 114 determines whether or not the processes of S1104 to S1108 have been completed for all the sheet feed trays installed in the printing apparatus 110. Here, in the case where it has been determined that the processes for all the sheet feed trays have not been completed, the process advances to S1104, where the CPU 114 performs the same processes for the remaining sheet feed trays. When the confirmation process ends for all the sheet feed trays, the process advances to S1109, where the CPU 114 confirms whether the sheet attributes have been edited by the operator. Here, when it is determined the sheet attributes have been edited, the process returns to S1104, where the CPU 114 performs the processes of S1104 to S1108 using the edited sheet attributes.

On the other hand, when it is determined in S1109 that the sheet attributes have not been edited, the process advances to S1110, where the CPU 114 confirms whether or not the operator has instructed the editing of the sheet attributes to end. Whether or not the operator has instructed the editing of the sheet attributes to end is determined based on whether or not the editing done button 520 in FIG. 5 has been pressed. In the case where the editing of the sheet attributes has been instructed to end in S1110, the process advances to S1111, where the CPU 114 registers the sheet attributes currently inputted in the sheet attributes editing screen 500 in the sheet library 210. The process then advances to S1112, where the CPU 114 closes the sheet attributes editing screen 500 and ends the series of processes.

On the other hand, when it is determined in S1110 that the editing of the sheet attributes has not been instructed to end, the process advances to S1113, where the CPU 114 confirms whether or not the operator has instructed the editing of the sheet attributes to be canceled. Whether or not the operator has instructed the editing of the sheet attributes to be canceled is determined based on whether or not the cancel button 521 in FIG. 5 has been pressed. In the case where the editing of the sheet attributes has been instructed to be canceled in S1113, the process advances to S1112, where the CPU 114 closes the sheet attributes editing screen 500 and ends the series of processes. On the other hand, in the case where the editing of the sheet attributes has not been instructed to be canceled in S1113, the process returns to S1109, where the CPU 114 continues the aforementioned processing.

Hereinafter, additional descriptions regarding how the sheet library editing screen 400 is displayed will be given using a specific example, based on the flowchart shown in FIG. 11. First, it is assumed that the sheet library 210 and the feedable sheet information 1003 are as shown in FIG. 3A and FIG. 10B, respectively.

Here, in the case where the edit button 421 is pressed in the sheet library editing screen 400 shown in FIG. 4 while the "XYZ COMPANY PAPER C081" is selected, the sheet library editing screen 400 is displayed in S1101. Next, it is determined in S1102 that the sheet is not being newly registered, and the process then advances to S1103, where the sheet attributes of the "XYZ COMPANY PAPER C081" are restored. The processes of S1104 to S1108 are then carried out for the sheet feeding trays 1 to 6. Here, the "XYZ COMPANY PAPER C081" can be fed to all of the sheet feed trays, and thus all of the check boxes 511 to 516 that correspond to the sheet feed trays are displayed normally, resulting in the sheet attributes editing screen 500 being displayed as shown in FIG. 5.

Here, a case where the sheet attributes have been edited by the operator will be described. It is assumed that the operator has changed the grammage to "300" in the sheet attributes editing screen 500 shown in FIG. 5. In this case, it is determined in S1109 that the sheet attributes have been edited, and thus the processes of S1104 to S1108 are once again performed for the sheet feed trays 1 to 6. At this time, it is assumed that because the grammage of the "XYZ COMPANY PAPER C081" has been changed, that sheet cannot be fed by the sheet feed tray 1 and the sheet feed tray 2. In this case, the sheet attributes editing screen 500 in FIG. 5 has a display such as that shown in FIG. 12A. In FIG. 12A, the check boxes 511 and 512 that correspond to the sheet feed tray 1 and the sheet feed tray 2, respectively, are grayed out, and thus it can be seen that that sheet (that is, the XYZ COMPANY PAPER C081) cannot be assigned to the sheet feed tray 1 and the sheet feed tray 2.

FIG. 12B illustrates a case in which the sheet attributes shown in FIG. 12A have been further changed so that the sheet width is now "120". In this case as well, it is determined in S1109 that the sheet attributes have been edited, and thus the processes of S1104 to S1108 are once again performed for the sheet feed trays 1 to 6. At this time, because the sheet width has been changed, the "XYZ COMPANY PAPER C081" cannot be fed by the sheet feed tray 3 in addition to the sheet feed tray 1 and the sheet feed tray 2. As shown in FIG. 12B, the check boxes 511, 512, and 513 that correspond to the sheet feed tray 1, the sheet feed tray 2, and the sheet feed tray 3, respectively, are grayed out in the sheet attributes editing screen 500, and thus it can be seen that that sheet (that is, the XYZ COMPANY PAPER C081) cannot be assigned to the sheet feed trays 1, 2, and 3.

According to the second embodiment as described thus far, in the case where a sheet cannot be fed by a sheet feed tray because the operator has changed the sheet attributes of that sheet, the operator can be notified that the sheet cannot be fed. As a result, when a user changes attributes of a sheet, the operator can quickly confirm the sheet feed trays to which that sheet cannot be assigned due to the change. Accordingly, even in the case where a user has changed the sheet library, the sheet feed trays to which that sheet can be assigned can be confirmed with ease, and thus a situation in which a sheet is assigned to a sheet feed tray to which that sheet actually cannot be assigned can be prevented from occurring.

Third Embodiment

In the first and second embodiments, whether or not to allow sheets to be assigned to the respective sheet feed trays provided in the printing apparatus is determined by the attributes of the respective sheets. However, it is generally possible to install more sheet feed trays that can be used in the printing apparatus by adding a sheet feed device. Each time a new sheet feed tray is installed, it is necessary for the operator to open the sheet attributes editing screen 500 for each sheet and set whether or not to allow sheets to be assigned to the newly-installed sheet feed tray. The third embodiment describes an example in which it is possible to set whether or not to allow sheets to be assigned in advance, even for sheet feed trays that are currently not installed in the printing apparatus. Note that the present embodiment will describe only areas that are different from the aforementioned first and second embodiments; identical configurations will be assigned the same reference numerals, and descriptions thereof will be omitted.

Figure 13:
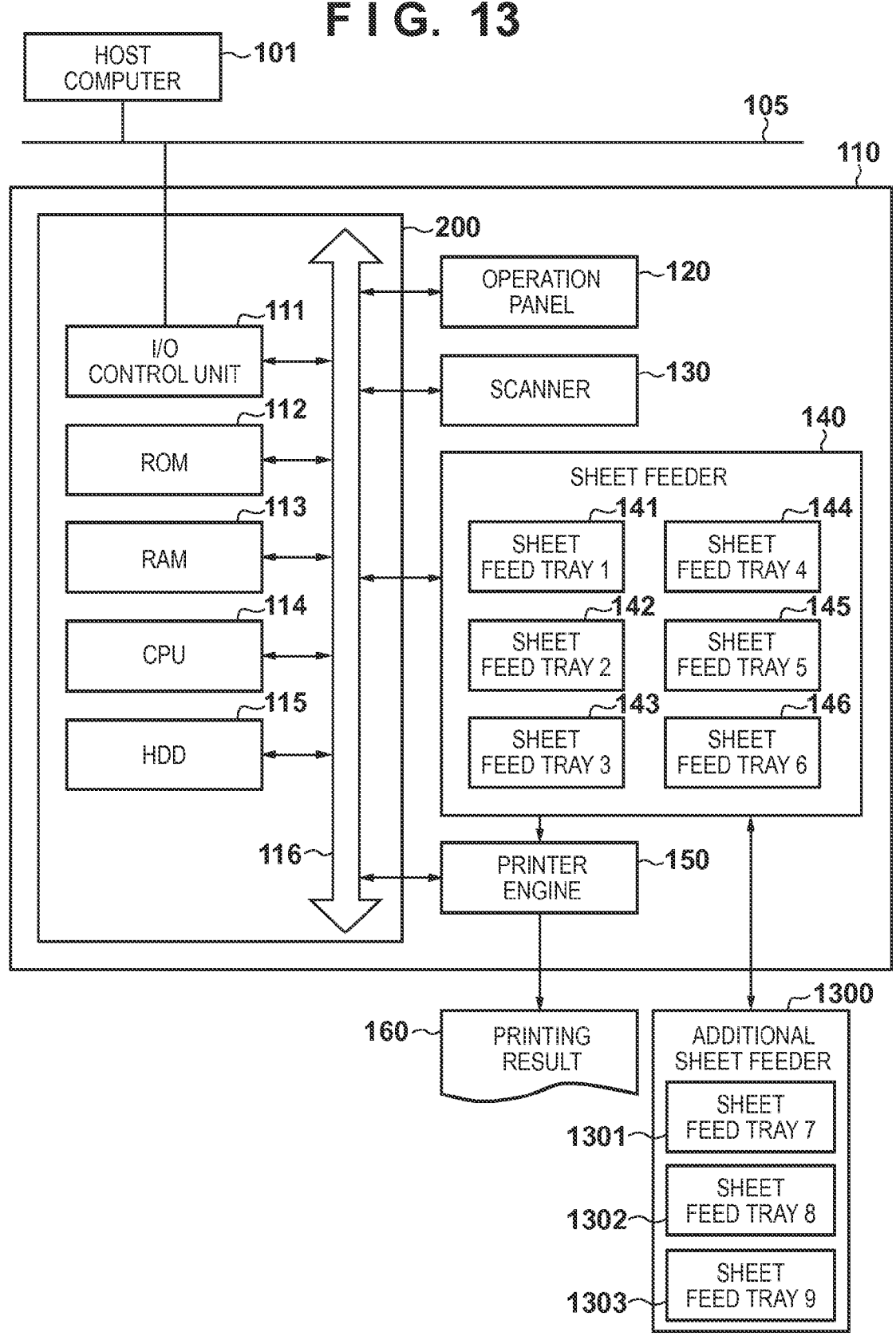
FIG. 13 is a block diagram illustrating the configuration of a printing system according to a third embodiment of the present invention.

FIG. 13 is a block diagram illustrating the configuration of a printing system according to a third embodiment of the present invention.

In FIG. 13, an additional sheet feeder 1300 that can be installed in the printing apparatus 110 is provided in addition to the configuration illustrated in FIG. 1. The additional sheet feeder 1300 is connected to the sheet feeder 140, and can exchange various information with the respective units in the printing apparatus 110 through the sheet feeder 140. The additional sheet feeder 1300 includes a plurality of sheet feed trays. In the third embodiment, a total of three sheet feed trays, or a sheet feed tray 1301 to a sheet feed tray 1303 (respectively called sheet feed trays 7 to 9 hereinafter) are present. In other words, six sheet feed trays, or the sheet feed trays 1 to 6, are present in the printing apparatus 110, and three additional sheet feed trays, or the sheet feed trays 7 to 9, are added by further connecting the additional sheet feeder 1300, making it possible to install a maximum of nine sheet feed trays. Each sheet feed tray is capable of separating the topmost of the sheets contained therein and conveying that sheet to the printer engine 150.

Figures 14A, 14B:
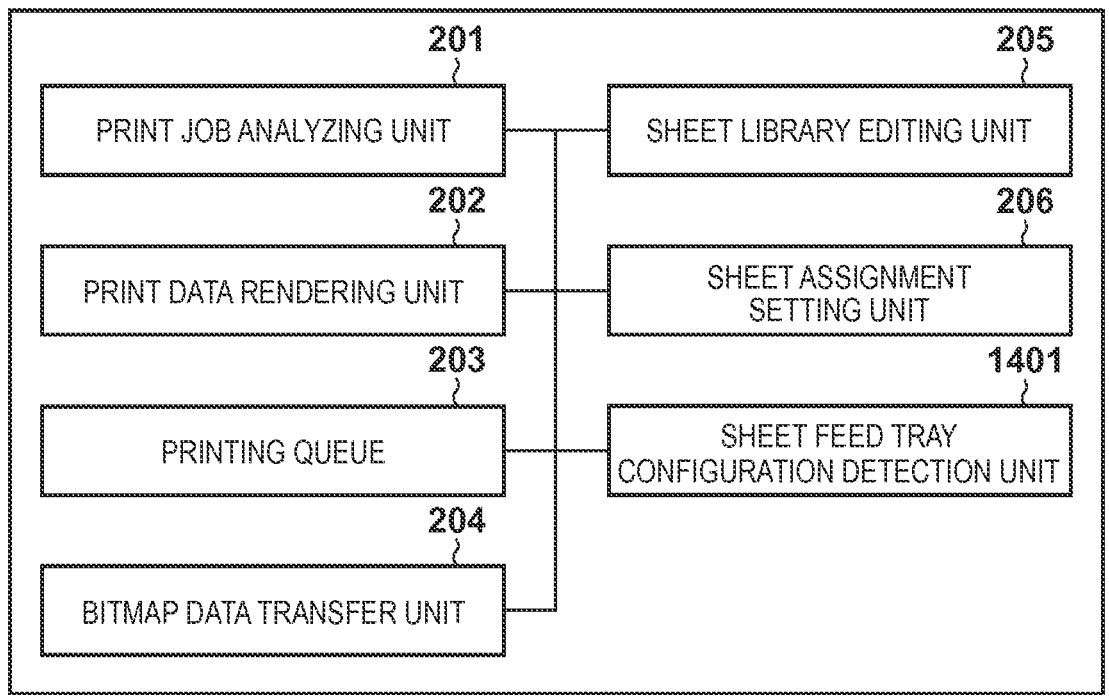
FIG. 14A is a functional block diagram illustrating the software module configuration of a printing apparatus according to the third embodiment.
FIG. 14B is a diagram illustrating a specific example of feedable sheet information saved in the printing apparatus according to the third embodiment.

FIG. 14A is a functional block diagram illustrating the software module configuration of the printing apparatus 110 according to the third embodiment. These software modules are disposed in the control unit 200, are stored in the ROM 112 or the HDD 115, and are loaded in the RAM 113 and executed by the CPU 114 as necessary. Note that the same reference numerals are given to elements that are the same as those shown in FIG. 2A, and descriptions thereof will be omitted.

In FIG. 14A, a sheet feed tray configuration detection unit 1401 for detecting the configuration of the sheet feed trays installed in the printing apparatus 110 is included in addition to the configuration illustrated in FIG. 2A. This sheet feed tray configuration detection unit 1401 is capable of detecting the configuration of the connected sheet feeders and the configuration of the sheet feed trays by communicating with the respective sheet feeders. Note that in the third embodiment, the setting information stored in the printing apparatus 110 has the same structure as that illustrated in FIG. 2A.

FIG. 14B is a diagram illustrating a specific example of the feedable sheet information 1003 that is saved in the printing apparatus 110 according to the third embodiment. The feedable sheet information 1003 is saved in the HDD 115, and is read out by the respective software modules as necessary.

Here, information of the sheet attributes of sheets that can be fed is shown in association with the sheet feed trays 1 to 9. Reference numerals 1411 to 1413 are the same as 1021 to 1023 illustrated in FIG. 10B, and thus descriptions thereof will be omitted. Although FIG. 14B shows the sheet width, the sheet height, and the grammage as the three factors for determining whether or not the sheet can be fed, other sheet attributes, such as the surface property, the thickness, or the like, may be added as well. Alternatively, whether or not a sheet can be fed may be determined based only on the sheet width and the sheet height.

A flow of processing when the operator edits the sheet attributes in a printing system having such a configuration will now be described.

Figure 15A:
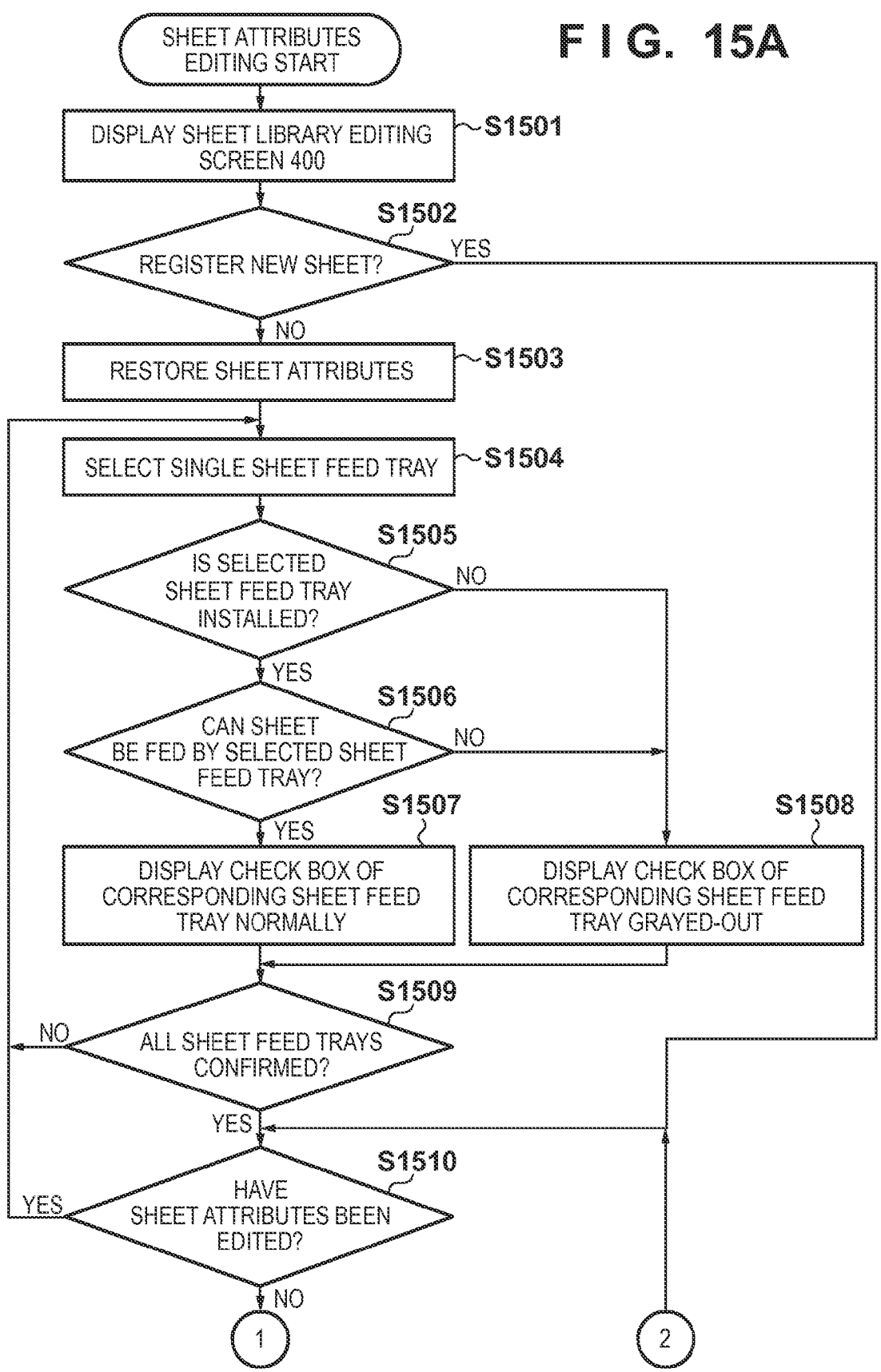

FIGS. 15A and 15B are flowcharts illustrating operations performed by the sheet library editing unit 205 in the printing apparatus according to the third embodiment. The sheet library editing unit 205 is executed by the CPU 114. This process is implemented by the CPU 114 executing programs that have been loaded in the RAM 113 from the ROM 112.

The processes from S1501 to S1504 in FIG. 15A are the same as the processes from S1101 to S1104 in FIG. 11, and thus descriptions thereof will be omitted. In the flowcharts shown in FIGS. 15A and 15B, in S1504, the CPU 114 selects a single sheet feed tray. The sheet feed tray selected here may be any sheet feed tray that is registered in the feedable sheet information 1003. That is to say, any of the sheet feed trays 1 to 9 may be selected, regardless of whether or not that sheet feed tray is currently installed in the printing apparatus 110. The process then advances to S1505, where the CPU 114 determines whether or not the sheet feed tray selected in S1504 is installed in the printing apparatus 110. The sheet feed trays that are installed in the printing apparatus 110 can be detected by the sheet feed tray configuration detection unit 1401. Here, in the case where the selected sheet feed tray is installed in the printing apparatus 110, the process advances to S1506. On the other hand, in the case where the selected sheet feed tray is a sheet feed tray that is not installed in the printing apparatus 110, the process advances to S1508, where the CPU 114 displays the check box for the corresponding sheet feed tray in a grayed-out manner. The processes from S1506 to S1514 are the same as the processes from S1105 to S1113 in FIG. 11, and thus descriptions thereof will be omitted.

FIGS. 16A and 16B are diagrams illustrating how the sheet attributes editing screen 500 for editing the sheet attributes is displayed to the operator according to the present embodiment. Here, a menu screen through which the operator newly adds a sheet will be described.

FIG. 16A illustrates the sheet attributes editing screen 500 in the case where the additional sheet feeder 1300 is connected to the printing apparatus 110. Check boxes 1601 to 1609 respectively indicate whether or not the sheet that is currently being edited is allowed to be assigned to the sheet feed tray 1 to the sheet feed tray 9. In this case, all of the sheet feed trays 1 to 9 are installed in the printing apparatus 110, and thus all of the check boxes 1601 to 1609 are displayed normally.

FIG. 16B illustrates the sheet attributes editing screen 500 in the case where the additional sheet feeder 1300 is not connected to the printing apparatus 110. In this case, the sheet feed trays 7 to 9 are not installed in the printing apparatus 110, and thus of check boxes 1611 to 1619, check boxes 1617 to 1619 that correspond to the sheet feed trays 7 to 9 are grayed out.

According to the third embodiment as described thus far, it is possible to set whether or not to allow sheets to be assigned in advance, even for sheet feed trays that are currently not installed in the printing apparatus. Accordingly, it is not necessary for the operator to open the sheet attributes editing screen for each sheet and set whether or not to allow the sheets to be assigned to newly-installed sheet feed trays each time such a sheet feed tray is newly installed, thus improving the convenience for the operator.

Fourth Embodiment

The aforementioned first to third embodiments describe examples in which whether or not to allow sheets to be assigned can be set on a sheet feed tray-by-sheet feed tray basis. Although this makes it possible to make detailed settings for the respective sheet feed trays, a large number of items are set in the case where a large number of sheet feed trays can be installed in the printing apparatus, and this makes the settings burdensome.

Accordingly, the fourth embodiment describes an example in which whether or not to allow sheets to be assigned can be set in accordance with characteristics of the sheet feed trays. Note that the present embodiment will describe only areas that are different from the first embodiment, and identical configurations will be assigned the same reference numerals as in the first embodiment. Note also that the overall hardware configuration and software module configuration of the printing system according to the fourth embodiment are the same as those illustrated in FIG. 1, FIG. 2A, and FIG. 2B and described in the first embodiment.

Figures 17A, 17B:
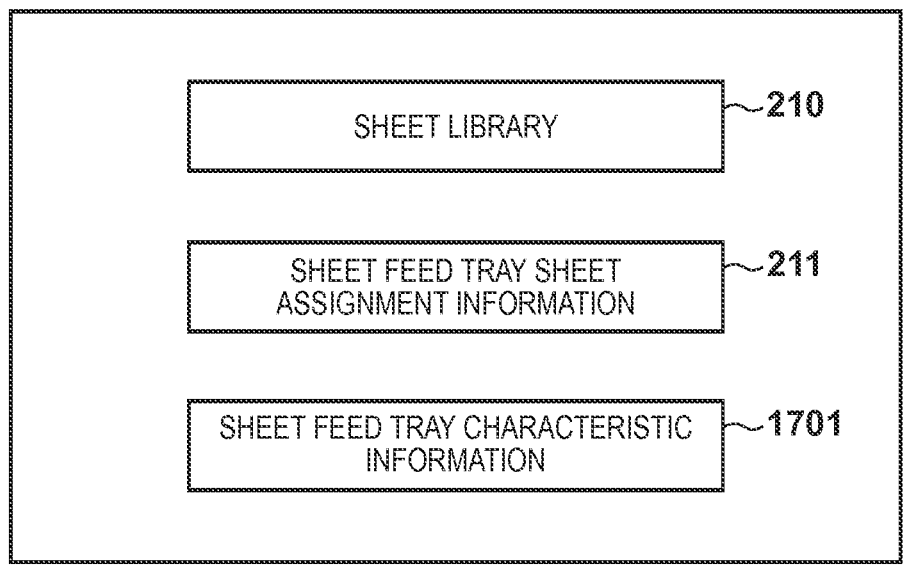
FIG. 17A is a diagram illustrating setting information that is saved in a printing apparatus according to a fourth embodiment.
FIG. 17B is a diagram illustrating sheet feed tray characteristic information that is saved in the printing apparatus according to the fourth embodiment.

FIG. 17A is a diagram illustrating setting information that is saved in the printing apparatus 110 according to the fourth embodiment. This setting information is saved in the HDD 115, and is read out and written by the respective software modules as necessary.

Note that in FIG. 17A, the same reference numerals are given to elements that are the same as those shown in FIG. 2B, and descriptions thereof will be omitted. Sheet feed tray characteristic information 1701 stores characteristic information held by the respective sheet feed trays, and is saved in the printing apparatus 110 in advance when the printing apparatus 110 is shipped. This sheet feed tray characteristic information 1701 may be provided as information for the hardware of the respective sheet feed trays, and the information may then be collected from the sheet feed trays when, for example, the printing apparatus 110 is started up. The detailed structure of the sheet feed tray characteristic information 1701 will be described later with reference to FIG. 17B.

FIG. 17B is a diagram illustrating the sheet feed tray characteristic information that is saved in the printing apparatus 110 according to the fourth embodiment. This sheet feed tray characteristic information is saved in the HDD 115, and is read out by the respective software modules as necessary.

Here, the characteristic information for each of the sheet feed trays 1 to 6 is shown. Reference numeral 1711 indicates whether or not the corresponding sheet feed tray includes a multi-feed detection sensor. The multi-feed detection sensor is a sensor for detecting when a plurality of sheets have been fed at the same time. Detecting that a plurality of sheets have been fed at the same time makes it possible to detect the occurrence of paper jams, printing errors, and the like in advance. Reference numeral 1712 indicates whether or not the corresponding sheet feed tray includes a sheet size detection sensor. The sheet size detection sensor is a sensor for detecting the size of the sheets contained in the sheet feed tray. Detecting the size of the sheets contained in the sheet feed tray makes it possible to prevent printing onto sheets of different sizes. Furthermore, using this sensor to detect the size of the sheets inserted into the sheet feed tray by the operator and then automatically setting the sheet size makes it possible to eliminate the burden of setting the size of the sheets set in the sheet feed tray. Reference numeral 1713 indicates whether or not the corresponding sheet feed tray includes an air-feed mechanism. The air-feed mechanism is a sheet feed mechanism that separates the uppermost sheet contained in a sheet feed tray by blowing air on the sheet in order to supply the sheet. Sheet feed trays having this air-feed mechanism can correctly separate the uppermost sheet with a high level of accuracy, resulting in a low likelihood that multi-feeding, in which a plurality of sheets are fed at the same time, will occur.

A flow of processing when the operator assigns sheets to the respective sheet feed tray in a printing system having such a configuration will now be described.

FIG. 18 is a diagram illustrating an example of a screen through which an operator edits the sheet attributes in the printing system according to the fourth embodiment.

1800 indicates an overall sheet attributes editing screen. The sheet attributes editing screen 1800 is displayed when the add new button 420 or the edit button 421 is pressed in the sheet library editing screen 400 shown in FIG. 4. The sheet attributes editing screen 1800 is generated by the CPU 114 executing the function of the sheet library editing unit 205, and is displayed in the operation panel 120.

Reference numerals 1801 to 1805 in FIG. 18 are the same as 501 to 505 illustrated in FIG. 5, and thus descriptions thereof will be omitted. Reference numeral 1810 indicates a check box group for designating sheet feed trays to which sheets can be assigned, and the check box group includes check boxes 1811 to 1813. The check box 1811 is checked in the case where the sheet currently being edited is allowed to be assigned, only for sheet feed trays having multi-feed detection sensors. The check box 1812 is checked in the case where the sheet currently being edited is allowed to be assigned, only for sheet feed trays having sheet size sensors. The check box 1813 is checked in the case where the sheet currently being edited is allowed to be assigned, only for sheet feed trays having air-feed mechanisms. Here, a check box being checked indicates that the operator allows the sheet currently being edited to be assigned to a sheet feed tray only if the sheet feed tray has the characteristic indicated by the check box.

In FIG. 18, the sheet currently being edited is allowed to be assigned only to sheet feed trays having multi-feed detection sensors and sheet feed trays having sheet size sensors. Such cases, where a plurality of check boxes are checked at the same time, indicate that the sheet is allowed to be assigned only to sheet feed trays that have all of the characteristics indicated by the checked check boxes.

When an editing done button 1820 is pressed, the sheet attributes input at that point in time are finalized and saved in the sheet library 210. After this, the sheet attributes editing screen 1800 is closed and the screen returns to the sheet library editing screen 400 shown in FIG. 4. When a cancel button 1821 is pressed, the process of editing the sheet attributes is stopped, the sheet attributes editing screen 1800 is closed, and the screen returns to the sheet library editing screen 400.

FIG. 19 is a diagram illustrating an example of the sheet library 210 saved in the HDD 115 or the like of the printing apparatus according to the fourth embodiment. Although a schematic diagram is used for the descriptions here, the sheet library 210 is actually saved as digital information in a format such as XML, CSV, or the like.

FIG. 19 illustrates the information of the respective sheets saved in the sheet library 210, and reference numerals 1911 to 1916 indicate sheet attributes designated for the respective sheets by the operator or the like. Reference numerals 1911 to 1915 indicate respective sheet attributes, or a sheet name, a sheet width, a sheet height, a grammage, and a color. 1916 indicates designation information of the sheet feed trays to which the respective sheets are allowed to be assigned. That is, reference numeral 1916 indicates information as to which of the check boxes 1811 to 1813 has been checked in the sheet attributes editing screen 1800 in FIG. 18. Here, "no designation" indicates that no check boxes have been checked.

Figure 20A:
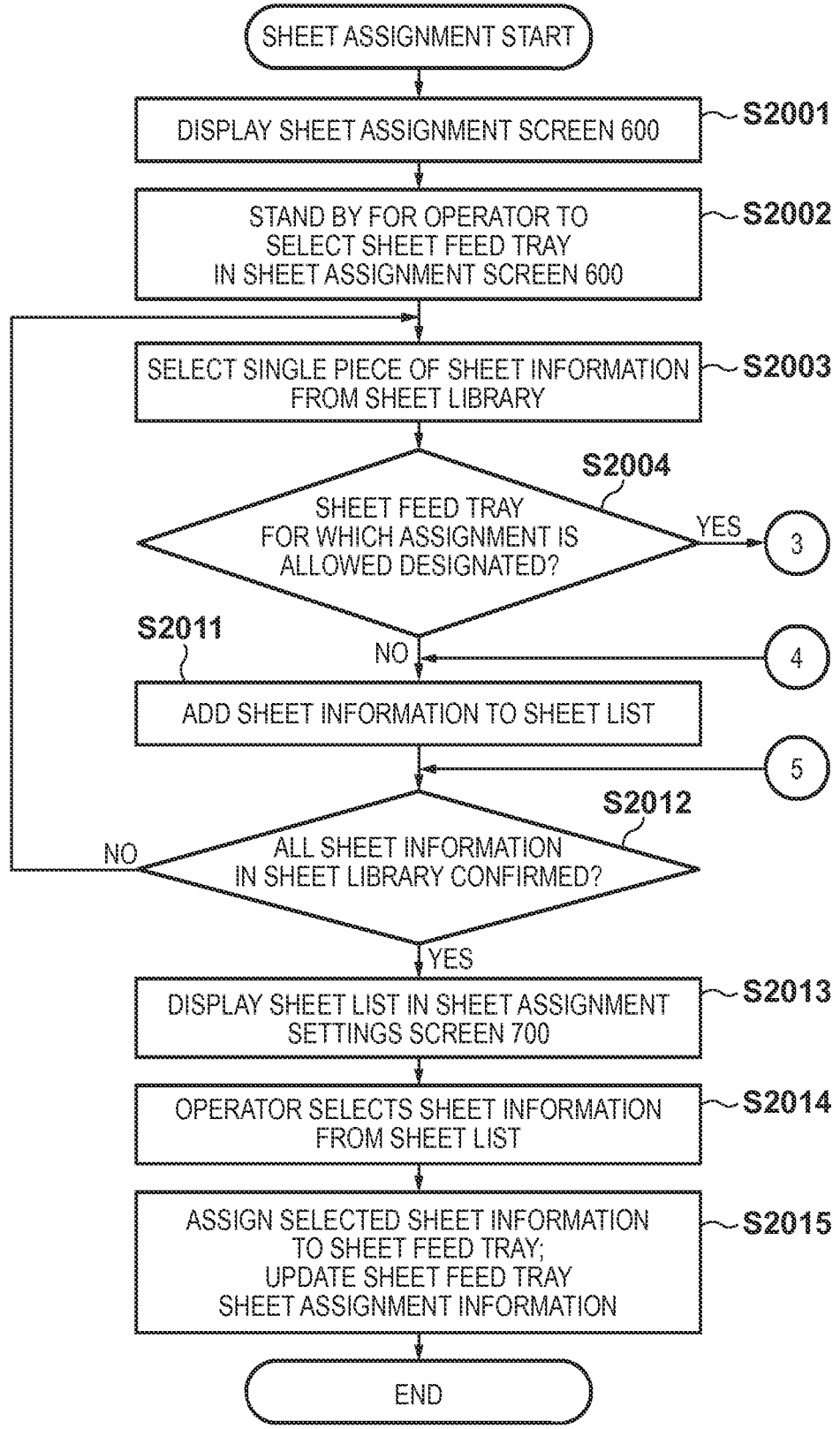
FIGS. 20A and 20B are flowcharts illustrating operations performed by a sheet assignment setting unit in the printing apparatus according to the fourth embodiment.
Figure 20B:
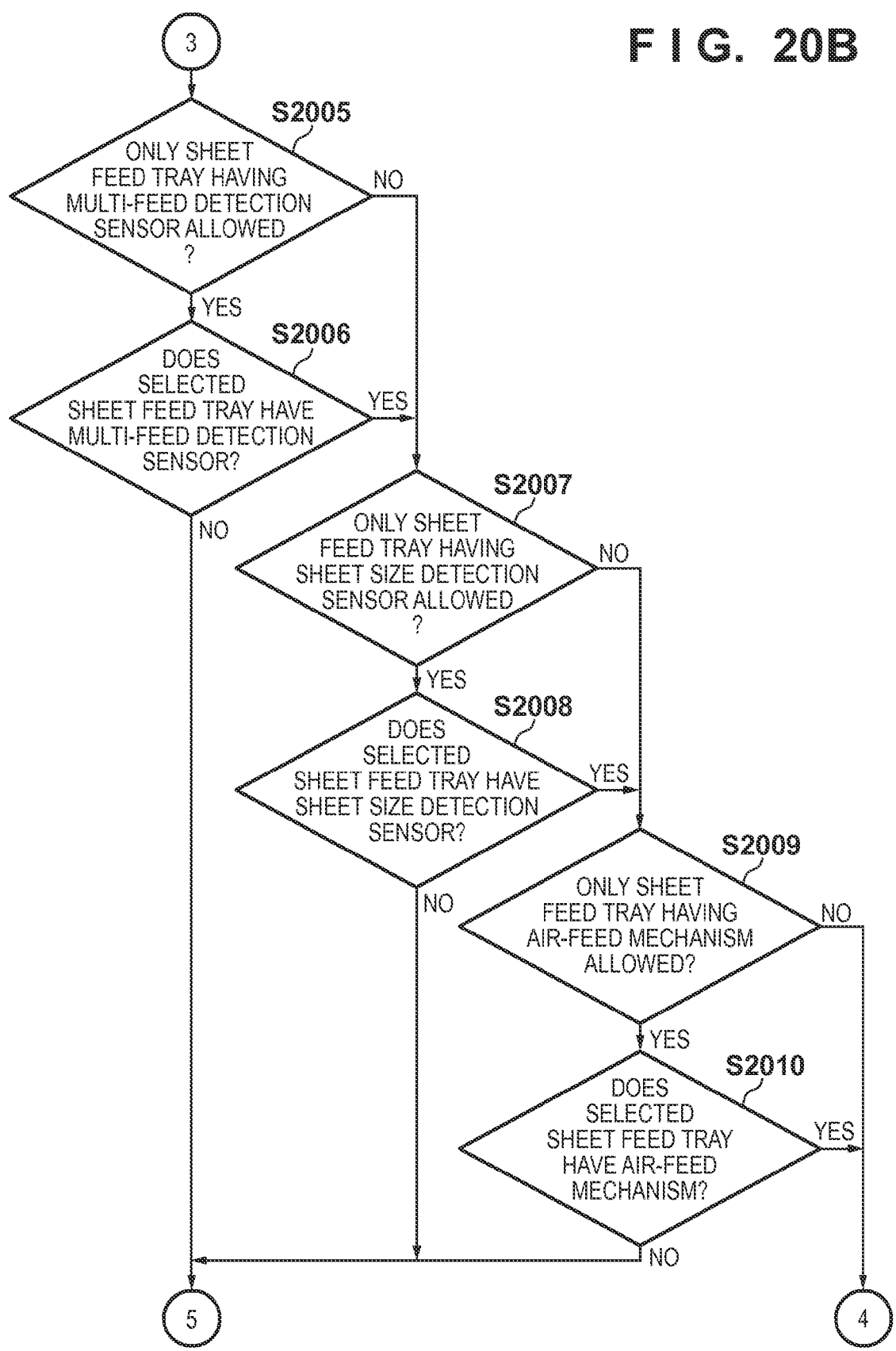

FIGS. 20A and 20B are flowcharts illustrating operations performed by the sheet assignment setting unit 206 in the printing apparatus according to the fourth embodiment. The sheet assignment setting unit 206 is executed by the CPU 114. This process is implemented by the CPU 114 executing programs that have been loaded in the RAM 113.

The processes from S2001 to S2003 in FIG. 20A are the same as the processes from S801 to S803 in FIG. 8, and thus descriptions thereof will be omitted. In S2004, the CPU 114 determines whether or not a sheet feed tray to which the sheet selected in S2003 is allowed to be assigned has been designated. The determination as to whether or not there is a designation is carried out by referring to the column 1916 in the sheet library 210 shown in FIG. 19. In the case where the column 1916 indicates "no designation", it is determined that a sheet feed tray to which the sheet is allowed to be assigned is not designated; the process advances to S2010, where the CPU 114 adds that sheet to the sheet list.

On the other hand, in the case where it is determined in S2004 that a sheet feed tray to which the sheet is allowed to be assigned is designated, the process advances to S2005, where the CPU 114 confirms whether that sheet is set to be assigned only to a sheet feed tray having a multi-feed detection sensor. The determination as to whether or not that sheet is set to be assigned only to a sheet feed tray having a multi-feed detection sensor is carried out by referring to the column 1916 in the sheet library 210. The process advances to S2007 in the case where the sheet is not set to be assigned only to a sheet feed tray having a multi-feed detection sensor. On the other hand, in the case where the sheet is set to be assigned only to a sheet feed tray having a multi-feed detection sensor, the process advances to S2006, where the CPU 114 determines whether or not the sheet feed tray selected in S2002 has a multi-feed detection sensor. The determination as to whether or not the sheet feed tray selected in S2002 has a multi-feed detection sensor is performed by referring to the sheet feed tray characteristic information 1701 illustrated in FIG. 17B. The process advances to S2011 in the case where it has not been determined that the sheet feed tray selected in S2002 has a multi-feed detection sensor. On the other hand, the process advances to S2007 in the case where it has been determined that the sheet feed tray selected in S2002 has a multi-feed detection sensor. The CPU 114 then confirms whether that sheet is set to be assigned only to a sheet feed tray having a sheet size detection sensor. The determination as to whether or not that sheet is set to be assigned only to a sheet feed tray having a sheet size detection sensor is carried out by referring to the column 1916 in the sheet library 210. The process advances to S2009 in the case where it has not been determined that the sheet is allowed to be assigned only to a sheet feed tray having a sheet size detection sensor.

In the case where it has been determined in S2007 that the sheet is allowed to be assigned only to a sheet feed tray having a sheet size detection sensor, the process advances to S2008, where the CPU 114 determines whether or not the sheet feed tray selected in S2002 has a sheet size detection sensor. The determination as to whether or not the sheet feed tray selected in S2002 has a sheet size detection sensor is performed by referring to the sheet feed tray characteristic information 1701 illustrated in FIG. 17B. The process advances to S2011 in the case where the sheet feed tray selected in S2002 does not have a sheet size detection sensor.

On the other hand, in the case where the sheet feed tray selected in S2002 has a sheet size detection sensor, the process advances to S2009, where the CPU 114 determines whether that sheet is set to be assigned only to a sheet feed tray having an air-feed mechanism. This determination is carried out by referring to the column 1916 in the sheet library 210. The process advances to S2010 when the sheet is set to be assigned only to a sheet feed tray having an air-feed mechanism. On the other hand, in the case where it has been determined the sheet is set to be assigned only to a sheet feed tray having an air-feed mechanism, the process advances to S2010, where the CPU 114 determines whether or not the sheet feed tray selected in S2002 has an air-feed mechanism. The determination as to whether or not the sheet feed tray selected in S2002 has an air-feed mechanism is performed by referring to the sheet feed tray characteristic information 1701 illustrated in FIG. 17B. The process advances to S2011 in the case where it has been determined that the sheet feed tray selected in S2002 does not have an air-feed mechanism. On the other hand, the process advances to S2010 in the case where it has been determined that the sheet feed tray selected in S2002 has an air-feed mechanism. The processes from S2011 to S2014 are the same as the processes from S806 to S809 in FIG. 8, and thus descriptions thereof will be omitted.

According to the fourth embodiment as described thus far, it is possible to set whether or not to allow sheets to be assigned in accordance with characteristics of the sheet feed trays. Accordingly, even in cases such as where a large number of sheet feed trays can be installed in the printing apparatus, it is not necessary for the operator to set whether or not to allow sheets to be assigned for all of the sheet feed trays, thus improving the convenience for the operator.

Other Embodiments

Although the aforementioned embodiments describe examples in which the feedable sheet information and the sheet feed tray characteristic information are managed separately, it goes without saying that the present invention can be applied even if the feedable sheet information and the sheet feed tray characteristic information are managed together as a single unit of information.

In addition, a plurality of pieces of assignment allowance sheet feed tray information may be held in advance for a single sheet, and may be capable of being switched based on, for example, the operator who operates the printing apparatus, a usage mode, and so on. Furthermore, a switch may be provided for temporarily disabling assignment allowance settings for the sheet feed trays and enabling sheets to be assigned to any sheet feed tray.

According to the embodiments described above, the likelihood of an operator making an assignment mistake when assigning sheets to a sheet feed tray can be reduced. Furthermore, in the case where a given sheet feed tray cannot feed a sheet due to the operator changing the sheet information of that sheet, the operator can be notified that the sheet cannot be fed. This makes it possible for the operator to quickly know whether or not that sheet can be assigned to the respective sheet feed trays, thus improving the convenience for the operator.

In addition, the sheets that are allowed to be assigned can be set even for sheet feed trays that are not currently installed in the printing apparatus. Accordingly, it is not necessary for the operator to assign the sheets to newly-installed sheet feed trays each time such a sheet feed tray is newly installed, thus improving the convenience for the operator.

Furthermore, whether or not to allow a sheet to be assigned to a sheet feed tray can be set in accordance with characteristic information of that sheet feed tray. Accordingly, even in cases such as where a large number of sheet feed trays can be installed in the printing apparatus, it is not necessary for the operator to set whether or not to assign sheets for all of the sheet feed trays, thus improving the convenience for the operator.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-128402, filed Jun. 5, 2012, which is hereby incorporated by reference herein in its entirety.

What is claimed is:
1. A printing apparatus comprising:
   a sheet feed tray;
   a storage unit configured to store a plurality of pieces of sheet information
   a setting unit configured to set, based on a designation by a user, whether or not to allow assignment of a particular piece of sheet information to the sheet feed tray;

a displaying unit configured to display a selection screen for a user to select, from among the plurality of pieces of sheet information, a piece of sheet information which is to be assigned to the sheet feed tray;

a controlling unit configured to
- in a case where assignment of the particular piece of sheet information to the sheet feed tray has been set to be allowed by the setting unit, control the displaying unit to display the selection screen such that the user can select the particular sheet information, and
- in a case where assignment of the particular piece of sheet information to the sheet feed tray has been set not to be allowed by the setting unit, control the displaying unit to display the selection screen such that the user cannot select the particular sheet information; and an assignment unit configured to assign the piece of sheet information selected by the user in the selection screen to the sheet feed tray.

2. The printing apparatus according to claim 1, wherein the controlling unit is configured to
- in a case where assignment of the particular piece of sheet information to the sheet feed tray has been set to be allowed by the setting unit, control the displaying unit to display the particular piece of sheet information as a candidate piece of information assignable to the sheet feed tray, and
- in a case where assignment of the particular piece of sheet information to the sheet feed tray has been set not to be allowed by the setting unit, control the displaying unit not to display the particular piece of sheet information as a candidate piece of information assignable to the sheet feed tray.

3. The printing apparatus according to claim 1, wherein the display unit is configured to display a setting screen for the user to designate whether or not to allow assignment of the particular piece of sheet information to the sheet feed tray.

4. The printing apparatus according to claim 1, wherein
the printing apparatus comprises a plurality of sheet feed trays, and
the setting unit is configured to set whether or not to allow assignment of the particular piece of sheet information to each of the plurality of sheet feed trays.

5. A method for controlling a printing apparatus which comprises a sheet feed tray and a storage unit configured to store a plurality of pieces of sheet information, the method comprising steps of:

setting, based on a designation by a user, whether or not to allow assignment of a particular piece of sheet information to the sheet feed tray;

displaying a selection screen for a user to select, from among the plurality of pieces of sheet information, a piece of sheet information which is to be assigned to the sheet feed tray;

in a case where assignment of the particular piece of sheet information to the sheet feed tray has been set to be allowed in the setting step, controlling the selection screen to be displayed such that the user can select the particular sheet information, and in a case where assignment of the particular piece of sheet information to the sheet feed tray has been set not to be allowed in the setting step, controlling the selection screen to be displayed such that the user cannot select the particular sheet information; and assigning the piece of sheet information selected by the user in the selection screen to the sheet feed tray.

6. A non-transitory computer-readable storage medium storing a computer program for causing a computer to execute steps of a method for controlling a printing apparatus which comprises a sheet feed tray and a storage unit configured to store a plurality of pieces of sheet information, the method comprising steps of:

setting, based on a designation by a user, whether or not to allow assignment of a particular piece of sheet information to the sheet feed tray;

displaying a selection screen for a user to select, from among the plurality of pieces of sheet information, a piece of sheet information which is to be assigned to the sheet feed tray;

in a case where assignment of the particular piece of sheet information to the sheet feed tray has been set to be allowed in the setting step, controlling the selection screen to be displayed such that the user can select the particular sheet information, and in a case where assignment of the particular piece of sheet information to the sheet feed tray has been set not to be allowed in the setting step, controlling the selection screen to be displayed such that the user cannot select the particular sheet information; and assigning the piece of sheet information selected by the user in the selection screen to the sheet feed tray.

* * * * *